(12) United States Patent
Yerazunis et al.

(10) Patent No.: US 11,548,165 B2
(45) Date of Patent: *Jan. 10, 2023

(54) ELASTOMERIC TACTILE SENSOR

(71) Applicant: Mitsubishi Electric Research Laboratories, Inc., Cambridge, MA (US)

(72) Inventors: William Yerazunis, Acton, MA (US); Scott Jordan, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 610 days.

This patent is subject to a terminal disclaimer.

(21) Appl. No.: 16/598,124

(22) Filed: Oct. 10, 2019

(65) Prior Publication Data

US 2021/0107166 A1 Apr. 15, 2021

(51) Int. Cl.
| | | |
|---|---|---|
| *B25J 13/08* | (2006.01) | |
| *G06T 7/73* | (2017.01) | |
| *G01B 11/16* | (2006.01) | |
| *G01L 5/00* | (2006.01) | |
| *G06V 10/75* | (2022.01) | |

(52) U.S. Cl.
CPC ............ *B25J 13/084* (2013.01); *G01B 11/16* (2013.01); *G01L 5/0061* (2013.01); *G06T 7/74* (2017.01); *G06V 10/751* (2022.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 2007/0040107 A1* | 2/2007 | Mizota | .................... | G01L 5/228 250/221 |
| 2008/0245955 A1* | 10/2008 | Tachi | ...................... | G01L 5/166 250/221 |
| 2020/0139543 A1* | 5/2020 | Saito | ........................ | B25J 15/10 |

* cited by examiner

*Primary Examiner* — Gelek W Topgyal
(74) *Attorney, Agent, or Firm* — Gennadiy Vinokur; Hironori Tsukamoto

(57) ABSTRACT

A tactile sensor including a camera positioned to capture images of marks. An elastically deformable skin including an outer surface having attributes and an undersurface having pins, ridges, or both. Each undersurface pin or ridge includes a mark. A processor detects displacement of the marks in captured images and compares the displaced positions of the marks in the captured images to stored sets of prelearned positions of marks, based on a distance function, to determine a quality of match value for each set of the prelearned positions of marks. A best quality matched prelearned pattern of forces is determined using a user selected function, to calculate a best matching set of the prelearned positions of marks. Identify a pattern of forces acting on the elastically deformable skin based on the determined best matched prelearned pattern of forces.

20 Claims, 17 Drawing Sheets

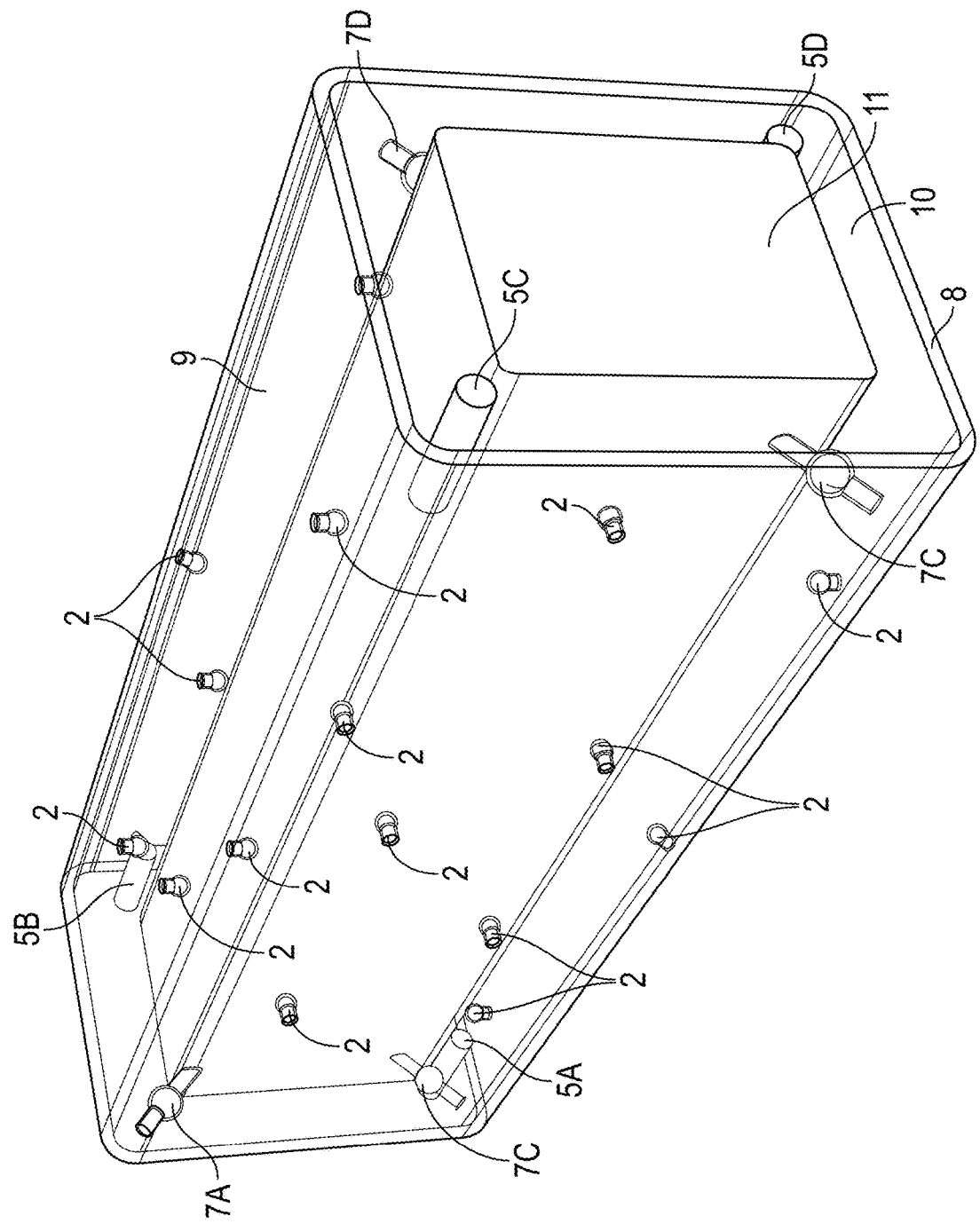

ELASTOMERIC TACTILE SENSOR

FIELD

The present disclosure relates to tactile sensing, and more particularly to an elastomeric tactile sensor, that is an elastically deformable skin with an outer impact surface and an undersurface attached with flexible spaces to a rigid surface. The undersurface includes pins, each pin includes a mark, and upon exterior forces applied to the outer impact surface, a pattern of forces characterizing the exterior forces is determined.

BACKGROUND

Conventional machines are used for manufacturing processing, including robots used for assembly of products, robots or autonomous vehicles for transporting parts or humans, etc. For example, conventional robotic systems include rigid outer surfaces consisting of rigid links with actuated degrees of freedom that are controlled with electric motors. The rigid outer surfaces or rigid links are very fragile if exposed to unplanned impact forces, causing in some instances catastrophic consequences, costing unaffordable repair cost, among other substantial impact events. The rigid links are precision devices where the position, velocity, and/or force at these degrees of freedom (or, in the case of rotating joints, angle, angular velocity, and/or torque) are controlled by a high-level controller coordinating the movement of each of the joints. The controller may run completely autonomously or be controlled manually in whole or in part by a human operator, as in the case of telerobotics.

However, if one or more component of the robot, such as the rigid surface of the rigid links, are impacted with an unexpected force, not only will the immediate impact region be damaged, but other components of the robot will also be damaged, such as mechanical components, electronic components, software components, network or communication components, etc. Some results due to the unexpected impact forces to conventional machines including conventional robots, are catastrophic impact costs related to manufacturing related processes such as the machine/robot repair costs, other objects impacted by the machine/robot repair costs, assembly line lost production costs, along with time lost (production & employee maximization) due to ordering new repair/replacement parts, if available. Probably, at least one of the most important or critical results can be creating an unsafe work environment, that could cause harm to human life, or loss of limbs for employees.

Robotic systems physically interact with their environment while moving through a manufacturing and operational environment or conducting a task such as an assembly task. The robot controller can obtain knowledge of its environment and respond to expected and unexpected events. For example, about autonomous systems, a machine vision device can be used to identify the location and orientation of objects and precision equipment may direct the robot to a specific location. However, algorithms for machine vision devices are slow and prone to errors when the vision is obstructed, surfaces are out of view, or there are shadows or is poor contrast.

In some conventional systems related to control of semi-autonomous robots from a distance, chiefly using Wireless networks (like Wi-Fi, Bluetooth, the Deep Space Network, and similar) or tethered connections, a human operator may interpret images from a video camera or observe the robot directly and may attempt to adjust commands to the robot as rapidly and precisely as possible. However, this mental concentration may be tiring to the operator and reaction time is often slow.

Quick reacting systems require precise robotics employing stiff mechanical linkages, high-quality position and force encoders, high-speed feedback controllers, and powerful and heavy motors. However, these components are costly and not practical for today's technologies requiring optimum cost saving related to operability. High impact forces from unexpected collisions with objects in the environment can also be catastrophic to either the robot or the object (including humans who may be in the workspace).

DC motors may drive industrial robotic hands or prosthetics associated with a human are externally powered artificial limb(s) that you control with the electrical signals generated naturally by the human's own muscles. The closing speed of an unloaded hand may be directly proportional to the voltage across the motors. In conventional prosthetic applications, this control voltage may be generated from amplified and filtered electromyography recordings of a prosthesis user's residual muscles to produce a voltage in proportion to muscle activation strength to capture a user's intent for opening or closing a hand. However, closing a prosthesis hand around a part of or unknown rigid object may cause the motors driving the fingertips to stall when they can no longer advance, which can cause high stalling forces.

A similar control problem may arise in preventing robot appendages from harming themselves or damaging external objects when collisions occur with or between appendages. These appendages may have hard surfaces. The impact force from a collision with a robotic actuator may increase with the hardness of the colliding surfaces and the relative speed of the robotic appendage and the object. By the time, a collision is detected by detecting increased loading on actuators, significant damage may have already occurred. An example of such a collision could be a robot appendage while moving un-intentionally hits a thin spear like object extending in the path of the moving robot, or other similar shaped type objects within the working and operational environment of the robot. This is a real issue especially in working environments with machines creating steam/mist/like smoke, which causes poor camera vision quality.

In conventional autonomous robotic applications, the ability to recognize contact may become even more challenging, with robots typically following a prescribed trajectory at full power and stopping only if the object offers substantially high enough resistance to stall the robotic actuators. Machine vision and ultrasonic proximity sensor approaches may help prevent unwanted collisions, but can be subject to high variability in accurately detecting an object before collision. Machine vision in particular can be subject to errors if the cameras become occluded or if lighting is poor. In applications where safety and reliability are of high concern, these technologies may therefore be less desirable.

Other conventional tactile sensors have a fluid-filled cavity and/or pressure sensing. Shinoda is mentioned in publication US 2010/0234997 by Sandini et al. describes a device that uses air pressure created in carefully shaped channels within a deformable polymer that is conveyed to microphones used as pressure sensors; and differential signals from these multiple sensors are used to extract directional force and slip vibrations. However, most robot use occurs in factories, which are noisy. The noise couples into the microphones, thus causing false triggers for force and slip when used in industrial situations.

Some conventional tactile sensing approaches have sensor arrays that do not offer much compliance, as well as tend to be insensitive to contact forces applied between discrete tactile cells. Patterning these sensory cells over complex surface can be challenging and costly and may result in areas that are insensitive to contact at the areas where contact sensitivity becomes the most important, such as edges and joints.

Conventional tactile sensors may identify the presence and an amount of pressure of an object, and the object's location in a gripper for robotic applications including assembly. However, most conventional machines or robotic sensors including conventional tactile sensors are based on a pressure sensor like design and measures only compressive forces without regard to other very important forces including shear force movement or other types of forces or pressures. For example, shear sensors are useful, for detecting a movement of an object, among other aspects. Also, the reaction time for many of the conventional machines or robotic sensors including conventional tactile sensors are not good or cannot achieve a response time that meets today's technological demands due to many reasons, including being computationally slow, subject to environmental aspects (i.e. cameras become occluded or lighting is poor), or due to a human operator error in the case of telerobotics. Other reasons include not being able to pattern sensor over complex surfaces that are critical regional areas, some conventional tactile sensor fail to detect/recognize unplanned contacts/impacts causing high stalling forces, and among many other reasons.

SUMMARY

The present disclosure relates to tactile sensing, and more particularly to an elastomeric tactile sensor, that is an elastically deformable skin with an outer impact surface and an undersurface attached with flexible spaces to a rigid surface. The undersurface includes pins, each pin includes a mark, and upon exterior forces applied to the outer impact surface, a pattern of forces characterizing the exterior forces is determined.

Some embodiments of the present disclosure include a tactile sensor that is an elastically deformable skin with an outer impact surface that may have attributes and an undersurface with pins, ridges, or both. Each undersurface pin or ridge includes a mark, and the undersurface can be arranged on flexible spacers from a rigid surface. A camera is positioned to capture images of the marks. A memory includes stored data with image data of sets of prelearned positions of marks with corresponding prelearned patterns of forces. Each set of prelearned positions of marks corresponds to a prelearned pattern of forces. An image processor operatively connected to the camera and the memory. The image processor can be configured to detect displacement of the marks in captured images. Compare the displaced positions of the marks in the captured images to the sets of the prelearned positions of marks, based on a distance function, to determine a quality of match value for each set of the prelearned positions of marks. Determine a best quality matched prelearned pattern of forces using a user selected best matching function, that is applied to the determined quality of match values, to calculate a best matching set of the prelearned positions of marks and the corresponding best quality matched prelearned pattern of forces. Identify a pattern of forces acting on the elastically deformable skin based on the determined best-matched prelearned pattern of forces. Output the identified pattern of forces to initiate an action based on the identified pattern.

The undersurface pins or mechanical deflection amplifying pins, i.e. micro mechanical pins (hereafter "pins") flex under pressure, shear, and torque. Each pin carries at least one mark, marker or fiducial marker, such as a white or a colored paint. When, the white marks are placed against a dark background, these marks can easy be tracked with machine vision algorithms. As motion of deflection caused by exterior forces to the outer impact surface, the outer impact surface deforms under pressure, offset pressure, shear forces, or torque forces, which is recorded, yielding a level of sensitivity that is higher when compared to a level of sensitivity of a conventional tactile sensor that merely measures deformation of just an outer impact surface. For example, when the outer impact surface deforms, the forces being applied translate the same forces to the undersurface, which causes the pins to be displaced, wherein the displacement of the marks from a starting position (i.e. when no exterior forces are applied to the outer impact surface), to a final position (i.e. after the exterior forces are applied). Unlike conventional tactile sensors that can record or measure only compressive forces without regard to shear movement or other types of forces or pressures, the present disclosure is sensitive to compressive forces, to shear, torque, pinch, and spreading forces on the elastically deformable skin.

In fact, realized from experimentation is that the pin can be customized or modified to include one or lever arm extending away from the pin, (i.e. to create a tree like figure). Wherein at each end of the lever arm, a white mark can be applied that can be a trackable mark or fiducial marker, that provides further measurable forces data. Based upon experimentation, the addition of the one or more lever arm on the pin, resulted in a level of magnification of sensitivity that was higher, (or a level of measurable forces), than a level of magnification of sensitivity of only a single a pin with only a single mark and without one or more lever arm. Thus, the one or more lever arm amplifies each pin level of magnification of sensitivity, or a level of measurable forces, yielding a higher measurable sensitivity or a higher level of measurable forces, for the elastically deformable skin. Some reasons why these types of configurations of the pins with levers can be useful, is that certain regions specific to particular applications, can be customized to position groups of pin in regions of to provide a higher measureable levels of sensitivities to prevent unexpected or expected impacts.

Another realization gained from experimentation is the development of the flexible spacers. In particular, one end of the flexible spacer is attached to the undersurface of the elastically deformable skin, and the other end of the flexible spacer is attached to a rigid surface, i.e. rigid outer surface of a machine, robot, etc. The flexible spacers can be constructed with customized characteristics, including different amounts of elasticity, different amounts of rigidity or stiffness, different amounts of strengths. Further, in order to achieve these customized characteristics different types of materials can be used to create the customized flexible spacers. Of course, depending upon the location of the flexible spacers, the customized characteristics can include different lengths, diameters or radii.

Unlike conventional tactile sensors that can record or measures only compressive forces without regard to shear movement or other types of forces or pressures. The embodiments of the present disclosure provide an elastomeric deformable skin configured to record and measure a pattern of forces acting upon and which causes motion of deflection of the outer impact surface. For example, the pattern of forces recorded or measured include the motion of deflection of the outer impact surface under pressure, offset pressures, shear forces, or torque forces, using one or more video camera or webcam(s). The one or more video camera views the marks or fiducial marks, by non-limiting example, at an oblique (zero to 20) degree angle, or at some other angle. At least one embodiment of the present disclosure includes using machine vision algorithms that match the marks motion to a pre-stored or pre-learned set of marks deflections, with interpolation, if necessary, to determine the pattern of forces or net force tensor on the outer impact surface of the elastically deformable skin.

As will be described in further detail, the elastically deformable skin, in particular, the pins and lever arms with marks can be customized according to different types of intended measurable sensitives, which can depend upon the types of patterns of forces applied to the outer impact surface of the elastically deformable skin.

Because of this microlever distortion gain, the images captured by the video camera have large motions in the fiducial marks and have much better signal to noise ratio compared to the conventional tactile sensor methods, which directly imaged the top surface of the contacting surface, either by grazing illumination or through a proxy of a hemispherical gel.

The use of independently moving microlevers also allows different parts of the elastically deformable skin to experience and report back drastically different local strains and forces. For example, part of the elastically deformable skin may be in left-to-right shear, an other side of the elastically deformable skin may be in right-to-left shear, and because the microlevers move freely rather than being captive in a continuous gel, the custom configuration of the sensor can correctly detect this situation as a surface torque rather than being insensitive to that particular set of forces, like that as a hemispherical gel would be insensitive to these particular set of forces.

Several experiments were undertaken in order to take advantage of these microlever-amplified fiducial mark motions to generate a force signal output. Some aspects considered included structurally arranging a fixed camera at different positions within a cavity of that the robot, vehicle or machine is positioned within. For example, the fixed camera captures images of the fiducial marks attached to the pins. The images are sent to a computer, wherein an inexpensive webcam camera is connected via USB to the computer running Debian Linux software, as according to at least one experiment, but clearly, other experiments included different types of cameras, camera positions, camera mounting arrangements, as well as other types of software.

On the computer, image-processing software can be used to extract the XY positions of each fiducial marker. Obviously, many different but similar image processing software methods exist, but the preferred method included using an open-source package "OpenCV". At least one realization gained is that not every mark needed to be in view of the camera or cameras, all of which would depend upon the specific application.

A next step included using a Pythagorean metric (square root of the sum of the squares of the X and Y differences); to determine a best match of an observed fiducial XY location against the pre-stored XY sets in the library. At least one surprising result was that this computation was very fast; each of the observed XY locations was compared to every pre-stored XY location in the pre-stored library; a "running tally" for each of the 50 or so pre-stored sets was maintained on an assumed basis that every fiducial mark is represented in each of the pre-stored sets once only, so each pre-stored set running tally was incremented by the Pythagorean distance between the observed XY fiducial location and the nearest pre-stored XY location of any fiducial within any given pre-stored set. In some application, during experimentation we found it unnecessary to track which observed XY fiducial location corresponded to which XY pin; merely "the closest XY, in some applications we didn't care about duplicates or re-use" which resulted in giving excellent results with extreme simplicity of coding.

In more rigorous terms, the Pythagorean metric in a preferred embodiment works can be stated as follows for a cap with k fiducial pins:

For any observed XY set OBS containing k XY pairs OBS_X[0 . . . k−1], OBS_Y[0 . . . k−1]

and any stored XY location set STO containing STO_X[0 . . . j−1],STO_Y[0 . . . j−1] and using the function PDIST(arg1, arg2, arg3, arg4) defined as the square root of the sum of the square of arg1 minus arg2 plus the square of arg3 minus arg4 (that is, SQRT ((arg1−arg2)^2+(arg3−arg4)^2); this is the Pythagorean distance formula.

Then preferred distance value between any observed (OBS) XY set and any stored (STO) set is:

Preferred_Distance=SUM_over_all k (MIN_over_all_j (PDIST (OBS_X[k], STO_X[k], OBS_Y[k], STO_Y [k])))

As noted above, the surprising result from this experimentation was that this computation was exceptionally fast; with 10 fiducial marks and 100 pre-stored library sets, there are 1000 XY pair-to-pair comparisons, which is 2000 squares, 1000 adds, and 1000 square roots or 4000 floating point operations in total. Which meant, and realized is that this is highly tractable method, with fantastic results, in view of the process configuration for even a most inexpensive microprocessor to perform, at well above a camera frame rate. Of course, more than 10 marks can be tested; this particular amount was used for experimentation.

The next step included employing the sum of the Pythagorean distance running tallies to sort the list of pre-stored XY location sets into a ranked quality of a match list, in order from lowest Pythagorean distance (best match) to lowest (worst match).

In some applications, a single best match is the only one desired and output by the sensor processing. For example, "no damage impact" versus "damage impact" versus "possible damage impact" versus "maintenance report impact" might be labels for some of the stored XY location sets, and so those would be output by the sensor processor. It should be noted that there is no prohibition on having multiple stored XY location sets that have the same label; there might be five or ten "maintenance report impact" possibilities, and based on the application, it might not be necessary or even useful for the downstream systems to know exactly which one. The different types of "maintenance report impact" or "damage impact" possibilities, can be maintenance or damage to a specific component, i.e. spacer, pin, camera, camera funnel, outer impact surface, outer impact surface and the under surface, an attributes, etc.

In other applications, may depend on choosing to output a sensor result that is some particular weighting, inverse weighting, or linear combination of the forces that were in effect when a particular stored XY location set was recorded.

It is also reasonable to limit the number of stored XY sets to be evaluated in the weighting, inverse weighting, or linear interpolation; typically, the best-matching (lowest Pythagorean distance) two or three stored XY location sets give the best accuracy for 1-dimensional problems, and four to six for two-dimensional, six to eight for three dimensional, and so on. The methods of the present disclosure as realized from experimentation are highly customizable to a user's specific application needs/requirements, i.e. types of measurable sensitivities regarding different types of patterns of forces or a single force, all the while using very inexpensive components including using an inexpensive microprocessor to perform, at well above a camera frame rate.

As noted above, the pins translate something hard to measure, such as a pattern of forces or net force tensor, into something easy to measure. That is, measuring is made easier based upon image motion of the free micro mechanical pin tips or ends, i.e. the image motion of the mark at the outer most end of the pin, is tracked by a camera, such as an inexpensive webcam, that views the pin tip at some angle. The pins tips can be continuously viewed by the camera prior to the motion of the pin tip, i.e. before forces are applied on the outer impact surface of the elastically deformable skin, during motion of the pin tip, i.e. while the forces are being applied to the outer impact of the elastically deformable skin, and after the motion of the pin tip has stopped, i.e. after the externally applied forces have stopped.

Some other aspects learned while experimenting with different combinations of attributes of the outer impact surface with combinations of pins configurations, resulted in useful realizations such as:

A) intentionally allowing the pins of the present disclosure to become substantially nonparallel even under symmetrical forces, was later discovered as at least one key aspect in detecting asymmetrical forces, shears, and torques on the pin tip;

B) constructing some configurations of the elastically deformable skin of the present disclosure with fewer pins, by non-limiting example, a number of pins in a range of 5 to 10 pins for a thumb-sized sensor, resulted in substantial measurable force tensor. A larger number of pins, such as over 100 pins or 200 pins, did not provide a level of measurable sensitivity that met some of the goals of the present disclosure, thus a much fewer number of pins were targeted for some embodiments of the present disclosure.

C) Asymmetric pins: Some embodiments of the present disclosure intentionally placed or arranged fewer pins asymmetrically on the underside of the elastically deformable skin. Such that, some pins were placed on lower angles of the asymmetric skin or on an edge of the elastically deformable skin, between a rounded fillet and a flat face of the elastically deformable skin. Some experimental results showed a larger amount of sensitivity of the elastically deformable skin as compared to pins located in a middle of the elastically deformable skin, i.e. not on the edges. In addition, the pin lengths can be staggered, and for highly optimized sensors, for example, when using a Finite Element Modeling (FEM), the FEM can indicate some pins have an asymmetric (highly elliptical or even a flying-buttress-like) base. Such that, this assists in nonparallel motion even for symmetric forces; and D) Oblique camera angles: instead of viewing along the Z axis (which requires 75-100 mm vertical height), viewing obliquely (usually at 10 degrees or so, along with staggered pin lengths, allow a zero-degree viewing angle, parallel with a plane of a gripper tip). As a result, it was learned that this presented an opportunity to use a sensor that is only about 10 mm to 20 mm thick, without loss of sensitivity to force, shear, and torque, as well as permits for the use of the elastically deformable skin of the present disclosure for both tight-spaces and tight space assembly. Other benefits/advantages are that the sensor can be used in a human-worn "teach glove" that records a proper force tensor to be applied during a robotic assembly operation, by non-limiting example. Noted, is that other camera angles could be utilized including 0-10 degrees, 10-15 degrees, 10-20 degrees and 15-30 degrees.

In sum, some of the realized structural configurations of the elastically deformable skin, by non-limiting example, discovered can include: (1) dimensional thickness, such as, uniform thickness or non-uniform thickness of the outer impact surface; (2) dimensional height, and depth of the elastically deformable skin; (3) type of material(s) of the elastically deformable skin, along with locations of the different types of materials making up the elastically deformable skin; and (5) how the elastically deformable skin is constructed/manufactured including three dimensional (3D) printing, a type of molding manufacturing process, etc. Also, the number of pins to be mounted/attached/molded to the underside of the elastically deformable skin, can depend on many factors (as learned from experimentation), for example, is that what was realized is that the number of pins can be dependent on a specific application based upon a user intention and goal(s), in terms of achieving a predetermined level of sensitively, durability, etc.

Another imaging processing method experimented with and will be used with some of the embodiments of the present disclosure can be a Finite Element Modeling (FEM) method. For example, in order to process the data generated from the captured images of the camera that include the pins movement, can be using the FEM method to process the data as a metamaterial design. A metamaterial is an object where the internal structure produces a final object whose physical properties (electrical, magnetic, mechanical, thermal) properties are markedly different than the bulk properties of it's constituent "real" materials, i.e. negative F, p, nearly arbitrary speed of light c, Poisson's ratio v or thermal conductivity K. Basically, the FEM model can predict elastomer deformation under different loadings. In addition, the elastomer pins elevate the surface profile and convert surface inclination into an easy-to-image XY motion, i.e. using low cost webcam images of the pin tips. Further, the structural design of the elastically deformable skin with fewer fiducial marks provides for simple image thresholding, no interframe tracking/ambiguity. In fact, it is possible to use OpenCV to track the pin tip's motion that is converted to a force map. This minimizes computational expense and maintains a high frame rate.

During experimentation, an inverse FEM proved to be computationally expensive. What was realized is that training of the model should be with real data. An aspect further learned from experimentation is that using Euclidean distance in a 14-dimensional space to a label situation with grasp position, angular pose, shear and torque, proved beneficial. For example, the computational time was very fast, i.e. an amount of computational cost proved very low, resulting in an ability of processing in real-time with an excellent visualization on one 1 GHz cpu (e.g. Raspberry Pi Zero).

In some cases, computing an actual force tensor or pattern of forces may be unnecessary, such that a simple comparison of the pin tip positions against a preset library of correct and incorrect images is sufficient to determine an impact to the elastically deformable skin, or interpolated against a library of known distortions to yield good estimates of the actual force tensor on the sensor in real time.

Other embodiments of the present disclosure also address todays industrial needs by providing benefits such as simple compact tactile sensors at a low-cost, low-mass, along with a shallow-profile, while delivering highly sensitive sensing of applied external forces on the elastomeric tactile sensor. Some of these benefits allow for the compact tactile sensor of the present disclosure to be used in technologies where prior conventional tactile sensors use proved too costly for different technological industries.

Some other realizations gained from experimentation included configurations of the camera positions in relation to the marks. For example, as motion of deflection caused by exterior forces to the outer impact surface, the outer impact surface deforms under pressure, offset pressure, shear forces, or torque forces, one or more video camera or webcam(s) located in view of the mark, record the motion of the marks before, during and after, the external applied force(s) are applied to the outer impact surface. The one or more video camera can be positioned to view the marks, by non-limiting example, at an oblique (zero to ~20) degree angle, or at some other angle. At least one embodiment of the present disclosure includes using machine vision algorithms that can match the mark's motion to pre-stored marks deflections, with interpolation, if necessary, to determine a pattern of forces or a net force tensor on the outer impact surface.

Based on experimentation, it was realized that when having the one or more video camera positioned with a viewing angle between zero and twenty degrees (zero to ~20), i.e. oblique angle, the camera arrangement resulted in a low profile elastomeric tactile sensor. Also realized is the positioning the cameras to provide overlapping views can provide full representations of the applied forces or pattern of forces applied to the outer impact surface. Some benefits and advantages of the low profile elastomeric sensor of the present disclosure, by non-limiting example, provides for a solution to some of today's technological problems of conventional tactile sensors due to their large profile(s). For example, the low profile elastomeric sensor of the present disclose is suitable not only for robot technological industry, but also for applications, by non-limiting example, related to prosthetic applications associated with a human skin or the like.

In contrast with conventional robots and conventional prosthetic applications have many problems, including having minimal tactile sense, which creates a problem for conventional specialized high precision robots to be used in working and operational robot environments that include constant unplanned movements and place locations of objects.

The reason is that specialized high precision robots cannot be used, because they are not operationally capable of incorporating an amount of quick reaction times in case of these types of object movements and unplanned place changes. Similarly, the conventional specialized high precision robots typically have little or no capability to know if the robot has un-intentionally hit or run into an object, which can result in a stalling effect that can cause harm or human safety issues or costly repairs to these types of robot. In order to overcome these problems of conventional specialized high precision robots, some embodiments of the present disclosure provide for a robust general-purpose elastically deformable skin that provides a full force set in pressure, translation, rotation, and shear, that can be used, by non-limiting example, for detecting if the robot, vehicle or machine has made an intended or unintended contact with an object with a quick response time preventing damage, stalling effects, and the like.

In regard to some elastically deformable skin configurations according to some embodiments, the elastically deformable skin includes multiple micro mechanical pins positioned on an underside of the elastically deformable skin. Each micro mechanical pin (hereafter "pin") can extend from the underside and outward away from the underside of the elastically deformable skin. Wherein pins are positioned on outer most ends of the undersurface, i.e. away from a center of the underside, the pin, having a mark or a fiducial tip marker (white or colored paint) has a motion damped only by air. The pins can be made of an elastomer material, such as silicone rubber, polyurethane, thermoplastic elastomer, natural rubber, polyisoprene, polyamide (nylon), polyethylene, polypropylene polyvinyl chloride, plasticized photo-polymerized acrylic or a mixture thereof. The outer impact surface of the elastomeric cap can be made of a deformable material or materials. By non-limiting example, the elastomeric cap can be made of silicone rubber, polyurethane, thermoplastic elastomer, natural rubber, polyisoprene, polyvinyl chloride, plasticized photo-polymerized acrylic, etc. such that it is contemplated the pins can be made of the same material as the elastomeric cap or of a different material or combination of materials. For example, the pins might be made of nylon and the body of the cap and impact surface can be made of polyurethane and fabricated as a double-shot injection molding. Such that it is contemplated the pins can be made of the same material as the outer impact surface or of a different material or a combination of materials.

As noted above, the pins translate something hard to measure, such as a pattern of forces or a net force tensor, into something easy to measure. That is, measuring is made easier based upon image motion of the free micro mechanical pin tips or ends, i.e. the image motion of the mark or fiducial tip marker at the outer most end of the pin, is tracked by a camera, such as an inexpensive webcam, that views the pin tip (or levers with marks) at some angle. The pins tips can be continuously viewed by the camera prior to the motion of the pin tip, i.e. before a force tensor is applied on the outer impact surface of the elastically deformable skin, during motion of the pin tip, i.e. while the pattern of forces are being applied to the outer impact surface of the elastically deformable skin, and after the motion of the pin tip has stopped, i.e. after the externally applied pattern of forces have stopped.

Practical Applications

Some embodiments of the present disclosure address todays technological tactile sensor need of addressing impact forces by providing elastically deformable skin at a low-cost, low-mass, along with a shallow-profile, while delivering highly customizable sensitivity sensing of the unexpected impact forces or applied external forces or a pattern of forces, on the elastically deformable skin.

For example, the attachability of the elastically deformable skin of the present disclosure (via the flexible spacers to a rigid surface) can be attached to very small high sensitive regional areas to provide customized measureable levels sensitivities to protect areas of the robot, vehicle, or machine. Further, these regional areas include fragile components, joints or other damage susceptible regional areas, which can be protected from impact forces, resulting in potential catastrophic component failure, costing unaffordable repair costs, down production costs, among other substantial impact events costly to managing the robot, vehicle or machine.

Some embodiments of the present disclosure provide customized performance measurable levels of sensitivities that address today's tactile sensing industry needs by detecting impact forces in a quick time to allow a quick action response in order to prevent an unsafe work environment that could cause harm to human life, or loss of limbs to employees. Further, embodiments of the present disclosure assist in safe operation of high precision robots, vehicle and machines in their movement where a position, velocity, and/or force at these degrees of freedom (or, in the case of rotating joints, angle, angular velocity, and/or torque), or for remote operations via mental concentration, are critical for a specific application, and prevention of damage by impact forces.

The elastically deformable skin of the present disclosure can prevent high stalling forces experienced with conventional tactile sensors. For example, the elastically deformable skin prevents the high stalling forces to occur, by acknowledging a response in real time that stops or prevents the prescribed trajectory at full power to the motors. Whereas, most conventional machines or robotic sensors including conventional tactile sensors fail to provide a shear movement or other types of like forces or pressures, i.e. shear sensors detect movement, which can be part of a cause for stalling forces. Preventing these damages or failures can translate into preserving and maintaining the operability of such components, as mechanical components, electronic components, software components, network or communication components, etc., of the robots, vehicles or machines. In addition, the embodiments of the present disclosure are no susceptible to poor working or operational environments having steam, mist, smoke, that can degrade conventional tactile sensing dependent upon camera vision configurations.

According to an embodiment of the present disclosure, a tactile sensor, including an elastically deformable skin including an outer impact surface having attributes and an undersurface having pins, ridges, or both, each undersurface pin or ridge includes a mark, and the undersurface is arranged on flexible spacers from a rigid surface. A camera positioned to capture images of the marks. A memory having stored data including image data of sets of prelearned positions of marks with corresponding prelearned patterns of forces. Each set of prelearned positions of marks corresponds to a prelearned pattern of forces. An image processor operatively connected to the camera and the memory. The image processor is configured to detect displacement of the marks in captured images. Compare the displaced positions of the marks in the captured images to the sets of the prelearned positions of marks, based on a distance function, to determine a quality of match value for each set of the prelearned positions of marks. Determine a best quality matched prelearned pattern of forces using a user selected best matching function, that is applied to the determined quality of match values, to calculate a best matching set of the prelearned positions of marks and the corresponding best quality matched prelearned pattern of forces. Identify a pattern of forces acting on the elastically deformable skin based on the determined best-matched prelearned pattern of forces. Output the identified pattern of forces to initiate an action based on the identified pattern.

Another embodiment of the present disclosure, a method for tactile sensing including providing an elastically deformable skin including an outer impact surface having attributes and an undersurface having pins, ridges, or both. Each undersurface pin or ridge includes at least one mark, and the undersurface is arranged on flexible spacers, the flexible spacers be attached to a rigid surface of a device. Providing a camera arranged to capture images of the marks, and capture images from the camera. Detecting displacement of the marks in captured images, to obtain displaced positions of the marks. Accessing a memory having stored data that includes image data of sets of prelearned positions of marks with prelearned patterns of forces, each set of prelearned positions of marks corresponds to a prelearned pattern of forces. Comparing the displaced positions of the marks in the captured images to the sets prelearned positions of marks of the image data, based on a distance function, to obtain a quality of match value for each set of the prelearned positions of marks, and apply a user selected best matching function to the quality of match values, to determine a best quality matched prelearned pattern of forces. Identifying a pattern of forces acting on the elastically deformable skin based on the determined best matched prelearned pattern of forces. Wherein the pattern of forces includes one or a combination of, a perpendicular pressure Z, a centered pressure, an offset pressure, a lateral force X, a shear force Y, torques in a pitch, a yaw, or a roll, a pinch lateral force X, or a pinch shear force Y. Outputting the identified pattern of forces to initiate an action based on the identified pattern.

According to another embodiment of the present disclosure, a system for controlling a robot, including an elastically deformable skin including an outer impact surface having attributes and an undersurface having pins, ridges, or both. Each undersurface pin or ridge includes at least one mark, and the undersurface is arranged on flexible spacers, the flexible spacers be attached to a rigid surface of a device. A camera arranged to capture images of the marks. A memory having stored data including image data of sets of prelearned positions of marks with corresponding prelearned patterns of forces, each set of prelearned positions of marks corresponds to a prelearned pattern of forces. An image processor operatively connected to the camera and the memory. The image processor is configured to detect displacement of the marks in captured images. Compare the displaced positions of the marks in the captured images to the sets of the prelearned positions of marks, based on a distance function, to determine a quality of match value for each set of the prelearned positions of marks. Determine a best quality matched prelearned pattern of forces using a user selected best matching function, that is applied to the determined quality of match values, to calculate a best matching set of the prelearned positions of marks and the corresponding best quality matched prelearned pattern of forces. Identify a pattern of forces acting on the elastically deformable skin based on the determined best-matched prelearned pattern of forces. Output the identified pattern of forces to initiate an action based on the identified pattern.

Another embodiment of the present disclosure includes a tactile sensor for a mobile device, including an elastically deformable skin including an outer impact surface having attributes and an undersurface having pins, ridges, or both. Each undersurface pin or ridge includes a mark, and the undersurface is arranged on flexible spacers attached a rigid surface of the mobile device. A camera positioned to capture images of the marks. A memory having stored data including image data of sets of prelearned positions of marks with corresponding prelearned patterns of forces, each set of prelearned positions of marks corresponds to a prelearned pattern of forces. An image processor operatively connected to the camera and the memory. The image processor is configured to detect displacement of the marks in captured images. Compare the displaced positions of the marks in the captured images to the sets of the prelearned positions of marks, based on a distance function, to determine a quality of match value for each set of the prelearned positions of marks. Determine a best quality matched prelearned pattern of forces using a user selected best matching function, that is applied to the determined quality of match values, to calculate a best matching set of the prelearned positions of marks and the corresponding best quality matched prelearned pattern of forces. Identify a pattern of forces acting on the elastically deformable skin based on the determined best-matched prelearned pattern of forces. Output the identified pattern of forces to a controller to initiate an action associated with the mobile device based on the identified pattern of forces.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1A is a schematic diagram illustrating an embodiment of the elastically deformable skin attached to a rigid surface of a device, such as, a robot, a vehicle or a machine, according to some embodiments of the present disclosure;

FIG. 1C is a camera 5C, and FIG. 1D is a pin 2 with a mark 3, according to some embodiments of the present disclosure.

Figure 1B:
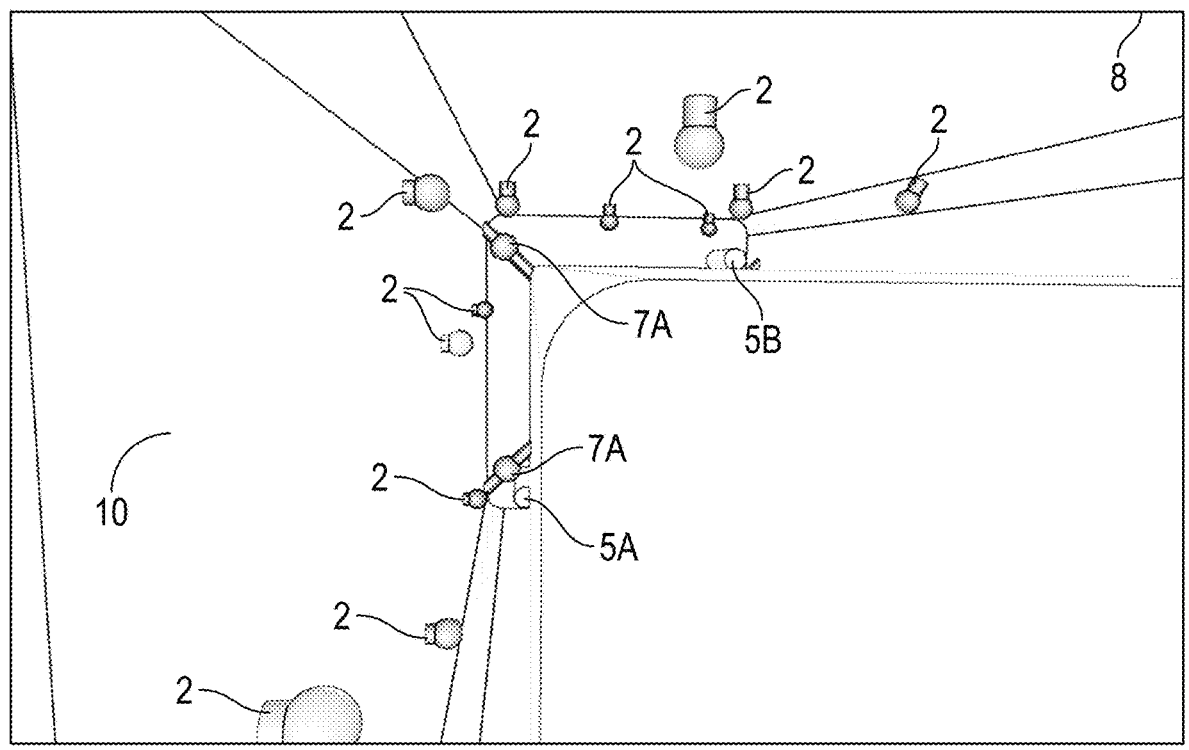
FIG. 1B, FIG. 1C and FIG. 1D is a schematic diagram illustrating a view of a camera 5C of FIG. 1A of the elastically deformable skin 8 attached to a rigid surface of the device 11, i.e. a robot, a vehicle or a machine.

While the above-identified drawings set forth presently disclosed embodiments, other embodiments are also contemplated, as noted in the discussion. This disclosure presents illustrative embodiments by way of representation and not limitation. Those skilled in the art can devise numerous other modifications and embodiments, which fall within the scope and spirit of the principles of the presently disclosed embodiments.

DETAILED DESCRIPTION

The present disclosure relates to tactile sensing, and more particularly to an elastomeric tactile sensor that is an elastically deformable skin with an outer impact surface and an undersurface attached with flexible spaces to a rigid surface. The undersurface includes pins, each pin includes a mark, and upon exterior forces applied to the outer impact surface, a pattern of forces characterizing the exterior forces is determined.

FIG. 1A is a schematic diagram illustrating an embodiment of an elastically deformable skin encasing a component 11, such as a robot or machine device, according to an embodiment of the present disclosure. An elastomeric tactile sensor includes an elastically deformable skin 8 having an outer impact surface 9 and an undersurface 10 that is attached via spacer's 7A-7D to the component 11. The undersurface 10 includes multiple pins 2, each pin 2 includes a mark or fiducial tip marker 3. Such that when a pattern of forces are applied to the outer impact surface 9, the elastically deformable skin 8 deforms placing the pins 2 in motion, and the marks or fiducial tip markers 3 undergo a flexing motion. For example, the markers 3 when placed in motion, are placed in motion by the pattern of forces, when pressures, forces, torques, pinches, stretches and the like are applied to the outer impact surface 9 which corresponds to the moving the pin 2, which moves the markers 3. The elastomeric tactile sensor also includes a camera 5A-5D positioned in view of the marks 3, and captures images of the marks 3 when placed in motion.

Figure 1C:
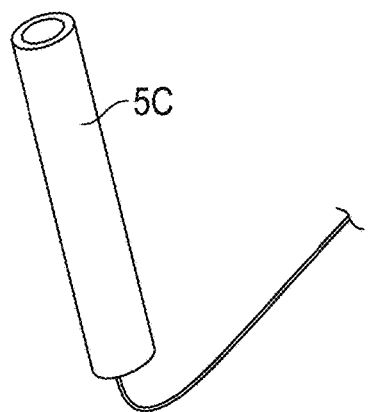
Figure 1D:
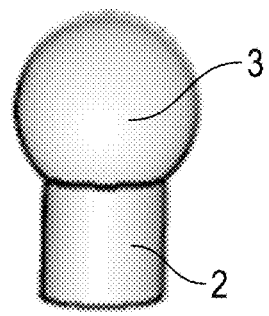

FIG. 1B, FIG. 1C and FIG. 1D, FIG. 1B is a schematic diagram illustrating a view of a camera 5C of the elastically deformable skin 8 attached to a rigid surface of the component 11, i.e. a robot or a machine, and FIG. 1C is a camera 5C, and FIG. 1D is a pin 2 with a mark 3, according to some embodiments of the present disclosure. The camera view of FIG. 1B is from camera 5C that views the underside 10 of the elastically deformable skin 8, pins 2, camera 5A, 5B and spacers 7A, 7B.

Figure 1E:
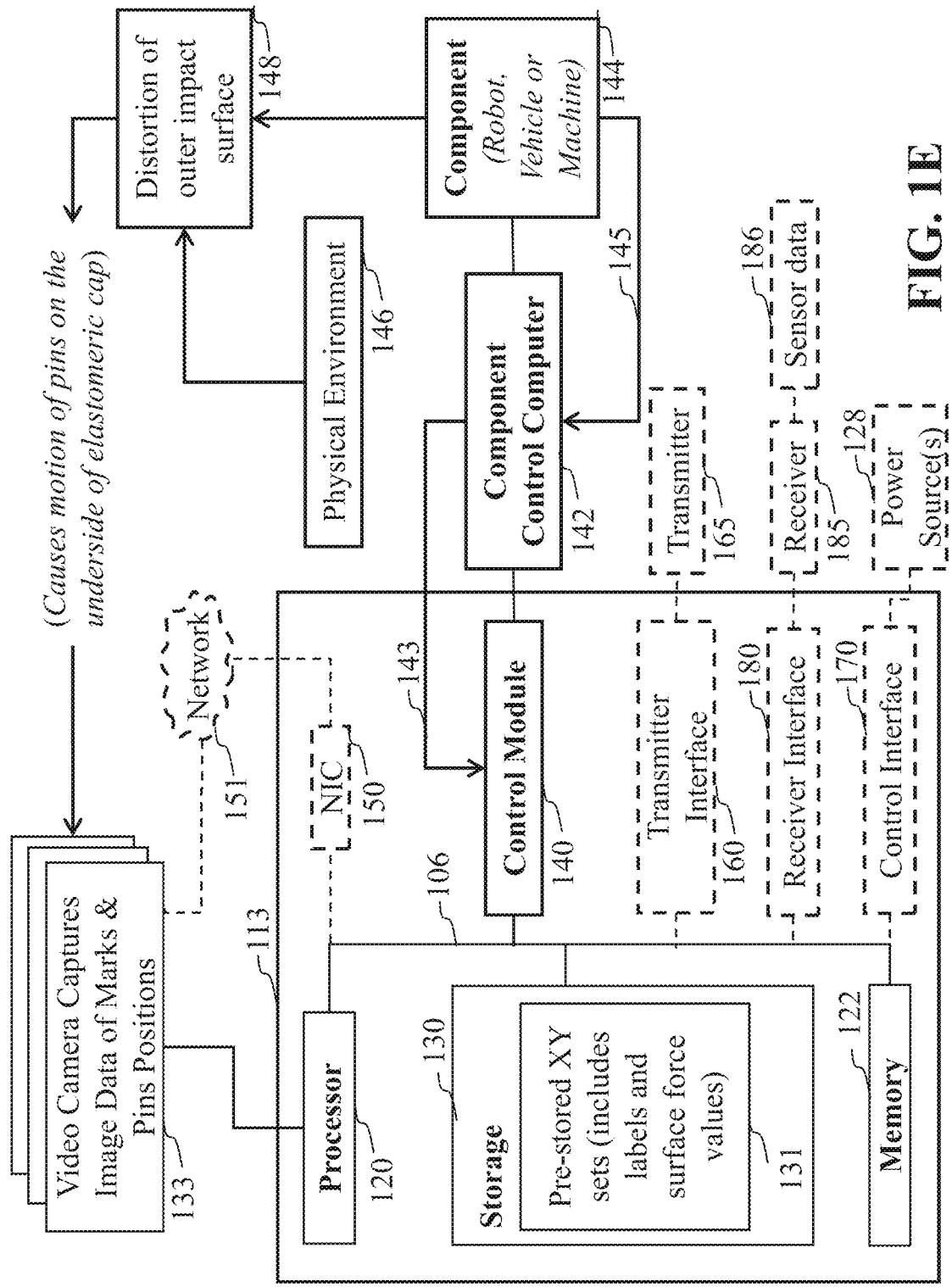
FIG. 1E is a schematic diagram illustrating some components used to implement some methods and systems of the present disclosure, according to some embodiments of the present disclosure.

FIG. 1E is a schematic diagram illustrating some components used to implement some methods and systems of the present disclosure, according to some embodiments of the present disclosure. Some of the methods and systems of the present disclosure include an elastically deformable skin that is part of an elastomeric tactile sensor that is attached to a component having a ridge surface, i.e. the component can include a robot, vehicle or machine. A sensor control computer 113 includes a hardware process 120, control module 140, storage 130 and a memory 122, all connected by bus 106. The hardware processor can implement or execute stored instructions that are stored in memory 122 and/or storage 130, in particular, the prestored XY sets 131 can be accessed by the hardware processor 120. The storage 130 can store the prestored XY sets 131 can include labels and force values. Optionally, the prestored XY sets with the labels and force values may be stored in either the storage 103, the memory 122, or both, all of which depends upon a specific application predetermined by a user.

A control Module 140 connected via the bus 106 is connected to the component control computer 142, such that the component control computer 143, can communicate back via 143 to the control module 140. For example, the control Module 140 can process scene data via the sensor data 186, which may implement a determined method to be performed in the sensor control computer 113.

Still referring to FIG. 1B, the component control computer 142 connects to the component 144, i.e. robot, vehicle or machine, wherein the component 144 can communicate back via 145 to the component control computer 142. For example, the component control computer 142 can control an action of moving the robot, vehicle or machine, or can send data back to the control module about assisting in generating an action command. The component control computer 142 can command the component 144 to move or do some other action.

Further, the component 144 is connected to the distortion of outer impact surface 148, where the physical environment 146 also is connected to the distortion of the outer impact surface 148. For example, the physical environment 146 includes an object or something that may cause an impact to the outer impact surface. Further, the distortion of the outer impact surface 148 is are exterior pressures or forces making up a pattern of forces or a net force tensor, that causes motion of the pins. Wherein at least one video camera 133 captures images of the marks and pins positions to obtain video image data. For example, the distortion of the outer impact surface 148 can be from exterior pressures, forces and the like, being applied to the outer impact surface 16 of FIG. 1A. The external or exterior pressures, forces and the like, can be a pattern of forces that embodiments of the present disclosure can determine an amount of measurable sensitivity for each pressure or force of the pattern of forces being externally applied to the outer impact surface 16 of FIG. 1A.

Still referring to FIG. 1B, optionally, the sensor control computer 113 can include a network interface controller 150 is adapted to connect the system 100 through the bus 106 to a network 151 connecting the control system 100 with a wireless system, that can receive wirelessly the video camera image data 133 of the captured images of the marks and pins positions, as well as other data. Also optionally, the sensor control system via the bus 106 can include a transmitter interface 160 connected to a transmitter 165, to transmit wirelessly data to a remote robot control computer (not shown), remote robot (not shown) or even a remote control module (not shown). Further still, the sensor control system 113 via bus 106 can be connected to a control interface connected to one or more power source 128. The control interface can provide data including action commands to the power source or other devices. Contemplated is that the power source(s) 128 could be one or a combination of a battery, alternate power source, 120-volt source, an alternative energy source, (i.e. sun, water, wind, etc.). In addition, the sensor control computer via bus 106 can include a receiver interface 180 connected to a receiver 185, to receive video image data or other data.

Figure 1F:
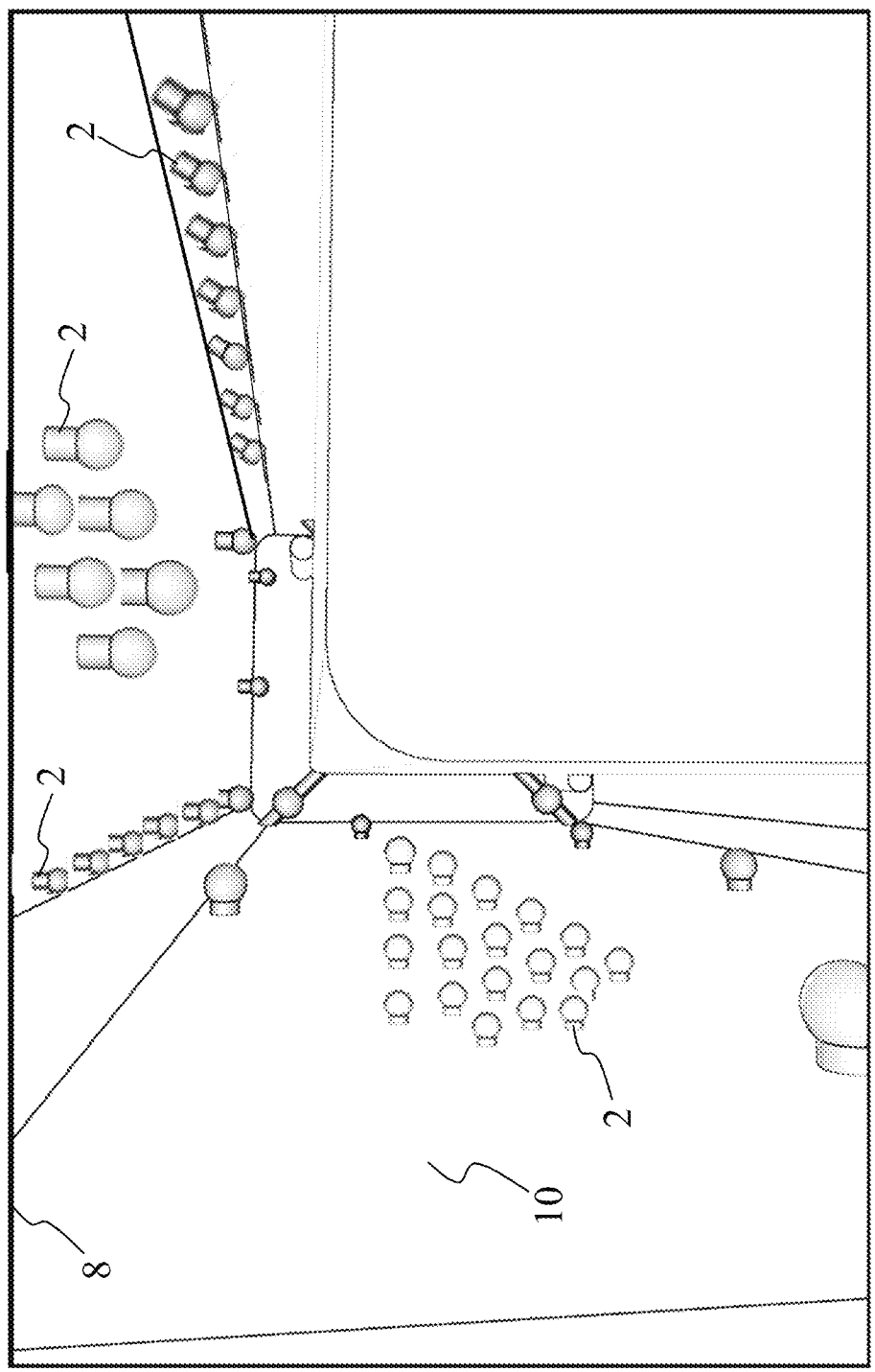
FIG. 1F is a schematic diagram illustrating another embodiment of the elastically deformable skin attached via spacers to a rigid surface of a device, such as, a robot, a vehicle or a machine, wherein pins are strategically structurally arranged to provide an amount of customized measurable sensitivities of one or more pressure(s), force(s), or a pattern of pressures and forces specific to an application, according to some embodiments of the present disclosure.

FIG. 1F is a schematic diagram illustrating another embodiment of the elastically deformable skin 8, wherein pins 2 attached to the undersurface 10 are strategically structurally arranged to provide an amount of customized measurable sensitivities of one or more pressure(s), force(s), or a pattern of pressures and forces specific to an application, according to some embodiments of the present disclosure.

Figure 1G:
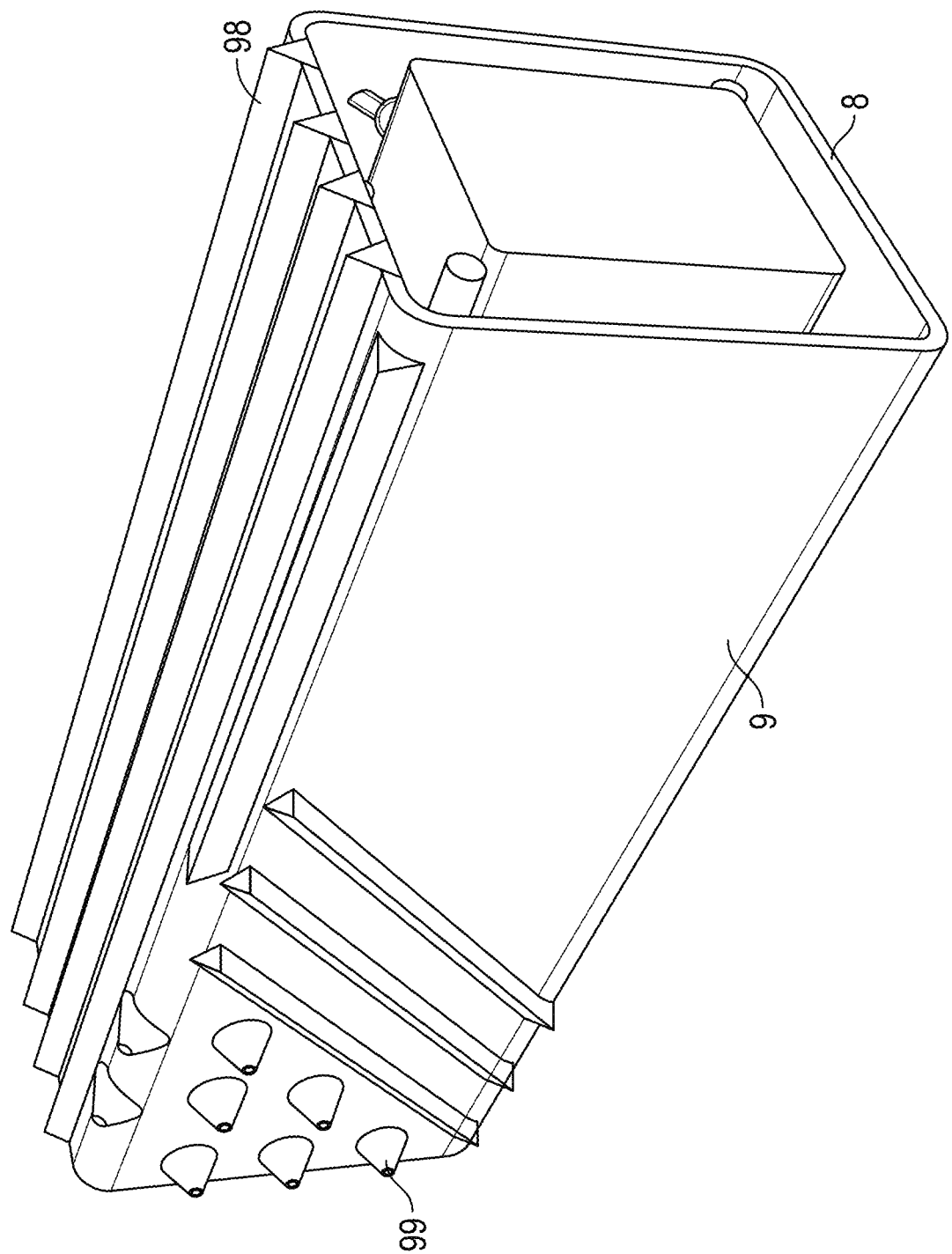
FIG. 1G is a schematic diagram illustrating another embodiment of the elastically deformable skin attached via spacers to a rigid surface of a device, such as, a robot, a vehicle or a machine, wherein the outer impact surface includes ridges and cones, that are strategically structurally arranged to provide an amount of customized measurable sensitivities of one or more pressure(s), force(s), or a pattern of pressures and forces specific to an application, according to some embodiments of the present disclosure.

FIG. 1G is a schematic diagram illustrating another embodiment of the elastically deformable skin 8, wherein the outer impact surface 9 includes patterns or non patterns of ridges 98 and cones 99, that are strategically structurally arranged to provide an amount of customized measurable sensitivities of one or more pressure(s), force(s), or a pattern of pressures and forces specific to an application, according to some embodiments of the present disclosure.

Figure 2A:
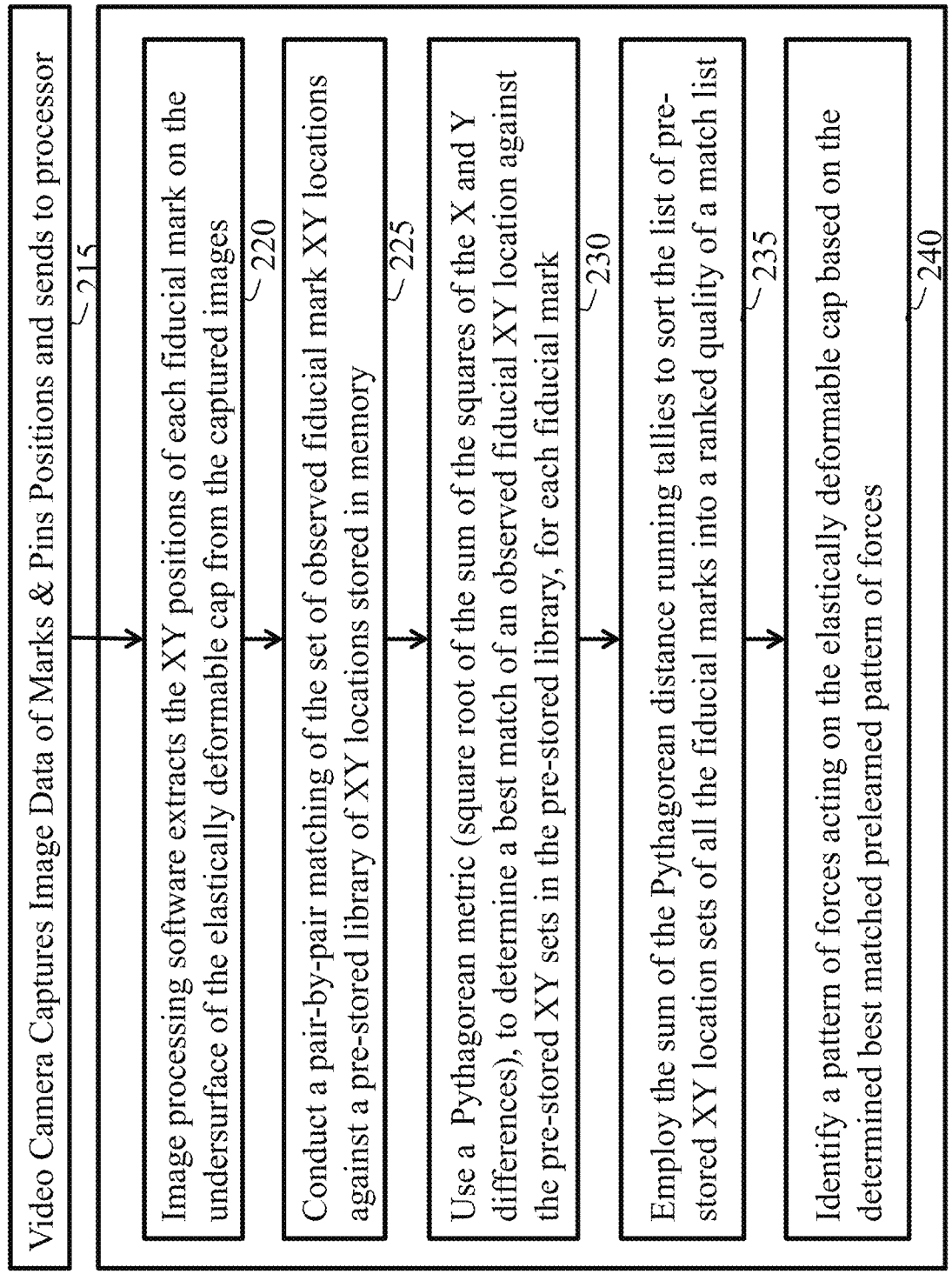
FIG. 2A and FIG. 2B are a flow diagrams illustrating embodiments of some steps for implementing a method, according to some embodiments of the present disclosure.
Figure 2B:
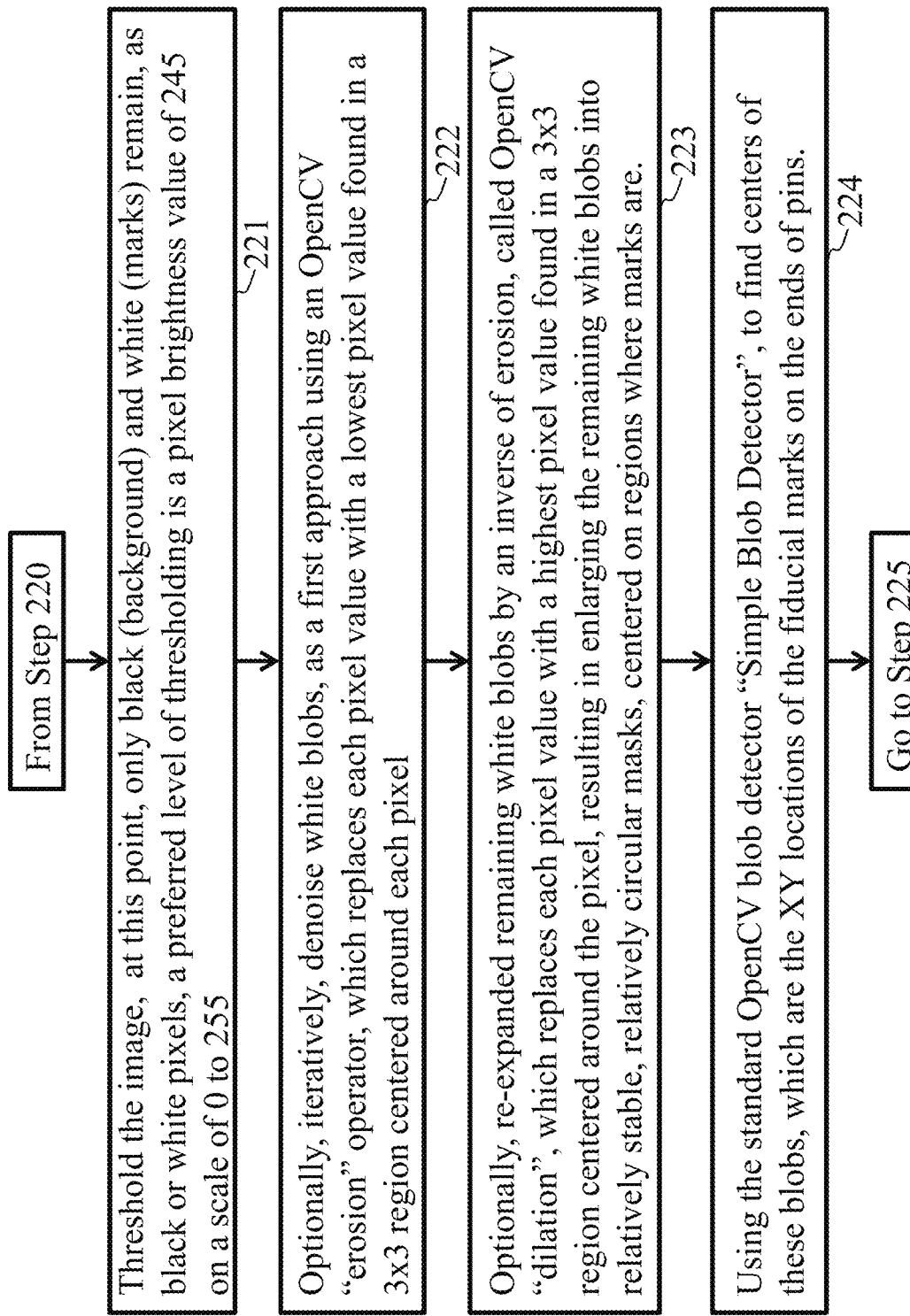

FIG. 2A and FIG. 2B are a flow diagrams illustrating embodiments of some steps for implementing a method, according to some embodiments of the present disclosure.

Step 215 of FIG. 2A includes capturing images of fiducial tip markers in motion from start to final end points using a camera(s), video camera(s) or web cam(s). For example, the fixed camera captures images of the microlever pins carrying the fiducial marks. The images are sent to a computer or processor, wherein an inexpensive webcam camera can be connected via USB to the computer running software such as Debian Linux software, as according to at least one experiment. However, clearly other experiments can include different types of cameras, camera positions, camera mounting arrangements, as well as other types of software.

Step 220 of FIG. 2A includes identifying measured image coordinates of locations in images of the captured images. On the computer, the image processing software can be used to extract the XY positions of each fiducial marker positioned on the undersurface of the elastically deformable skin. Obviously, many different but similar methods exist, but the preferred method included using an open-source package "OpenCV". Realized is that not every mark needed to be in view of the camera, depending upon the specific application. Initially, during this experimentation color, webcam image had been reduced some to a grayscale image, but this is not required, and is optional.

Referring to FIG. 2B, optionally, step 221 can include a method step used to threshold the image. At this point, only black (the background) and white (the fiducial marks) remain, as black or white pixels. A preferred level of thresholding is a pixel brightness value of 245 on a scale of 0 to 255, by non-limiting example. This approach appeared to present the fiducials as white irregular blobs in a black field, along with specks of white from noise or fabric lint contamination in the sensor.

Also, referring to FIG. 2B, optionally, step 222 can include a method step used to denoise the white blobs, a first approach by the OpenCV "erosion" operator, replaced each pixel value with a lowest pixel value found in a 3×3 region centered around each pixel. This erosion approach was performed three times, which removed noise pixels and lint contamination from the image; this was because these noise features are generally less than six pixels across.

Also, referring to FIG. 2B, optionally, step 223 can include a method step used to reexpanded the remaining white blobs by an inverse of erosion, called OpenCV "dilation". Which replaced each pixel value with a highest pixel value found in a 3×3 region centered on the pixel. That resulted in enlarging the remaining white blobs into relatively stable, relatively circular masks, centered on regions where the fiducial marks are. We then use this mask image with the grayscale image to eliminate essentially all of the noise and contamination from the grayscale image, because areas/regions/places where the erode/dilate processed, did not recover a stable area are black (zero) and when logic-ANDed with the original image, yields a black background that makes marker detection fast and with very low noise.

Also, referring to FIG. 2B, optionally, step 224 can include a method step using the standard OpenCV blob detector "Simple Blob Detector", to find centers of these blobs, which are the XY locations of the fiducial marks on the ends of the microlever pins.

Referring to FIG. 2A, step 225 includes determining a set of relative displacements of the fiducial marks in the captured images. For example, because the number of such XY pairs is equal to the number of fiducial marks, and is small (for these experiments, just seven fiducial pins were used), the next step 225 can be to do a pair-by-pair matching of the set of observed fiducial mark XY locations against a pre-stored library of XY locations.

The pre-stored library of XY location was earlier produced through a course of many experiments. For this particular set of experiments fewer than 50 pre-stored XY sets where stored in a memory in the pre-stored library database, that resulted in giving excellent resolution and usability. Of course, that more than 50 pre-stored XY sets can be stored in the pre-stored library database, however, for these sets of experiments, 50 pre-stored XY sets appeared to be sufficient to reach some of the goals according to some aspects of the present disclosure.

Step 230 of FIG. 2A includes steps of how to figure out a pattern of forces or determining a net force tensor acting on the top surface of the elastically deformable skin. As a general overview the pattern of forces can be determined by matching the set of relative displacements of the fiducial tip markers to a stored set of previously learned relative displacements of the fiducial tip markers placed in motion, and then identifying the pattern of forces associated with the stored set of previously learned relative displacements of the fiducial tip markers.

Thus, step 230 of FIG. 2A begins with a method step using a Pythagorean metric (square root of the sum of the squares of the X and Y differences); to determine a best match of an observed fiducial XY location against the pre-stored XY sets in the library. This computation was very fast; each of the observed XY locations was compared to every pre-stored XY location in the pre-stored library; a "running tally" for each of the 50 or so pre-stored sets was maintained on an assumed basis that every fiducial mark is represented in each of the pre-stored sets once, so each pre-stored set running tally was incremented by the Pythagorean distance between the observed XY fiducial location and the nearest pre-stored XY location of any fiducial within any given pre-stored set. While conducting experimentation for this step, initially there was an assumption for the need or a necessity, to track individual marks over time (i.e. the leftmost mark in the front row corresponds to the fourth XY coordinate in the fourth pre-stored library set, etc.), However, later experimentation showed this assumption was completely an unnecessary computation, and that this can be omitted without loss of accuracy.

Still referring to step 230 of FIG. 2A, a surprising result from this experimentation is that this computation was exceptionally fast; with 10 fiducial marks and 100 pre-stored library sets, there are 1000 XY pair-to-pair comparisons, which is 2000 squares, 1000 adds, and 1000 square roots or 4000 floating point operations in total. Which meant, and realized is that this is highly tractable method, with fantastic results, in view of the process configuration for even a most inexpensive microprocessor to perform, at well above a camera frame rate.

Step 235 of FIG. 2A includes can include a method step employing the sum of the Pythagorean distance running tallies to sort the list of pre-stored XY location sets into a ranked quality of a match list.

In some applications, a single best match is the only one desired and output by the sensor processing. For example, "no damage impact" versus "damage impact" versus "possible damage impact" versus "maintenance report impact" might be labels for some of the stored XY location sets, and so those would be output by the sensor processor. It should be noted that there is no prohibition on having multiple stored XY location sets that have the same label; there might be five or ten "maintenance report impact" possibilities, and based on the application, it might not be necessary or even useful for the downstream systems to know exactly which one. The different types of "maintenance report impact" or "damage impact" possibilities, can be maintenance or damage to a specific component, i.e. spacer, pin, camera, camera funnel, outer impact surface, outer impact surface and the under surface, an attributes, etc.

Still referring to step 230 of FIG. 2A, in other applications, may depend on choosing to output a sensor result that is some particular weighting, inverse weighting, or linear combination of the forces that were in effect when a particular stored XY location set was recorded. For example, if downward forces at 1, 2, 5, and 10 newton's were recorded, and the corresponding fiducial XY location sets stored, and then the sensor was subject to an unknown force, an image might be captured, where the image is processed as described above, to obtain Pythagorean distances, and then can be proceeded as follows:

Pythagorean distance to 1 newton stored XY set=350
Pythagorean distance to 2 newton stored XY set=100
Pythagorean distance to 5 newton stored XY set=50
Pythagorean distance to 10 newton stored XY set=400

... which then might be calculated as follows:
sum of inverses of weights=1/350+1/100+1/50+1/400=0.0353
weighting of 1 newton sample=1*[1/350]/0.0353=0.080
weighting of 2 newton sample=2*[1/100]/0.0353=0.566
weighting of 5 newton sample=5*[1/50]/0.0353=2.832
weighting of 10 newton sample=10*[1/400]/0.0353=0.708
total weighted sum: 4.186
 . . . indicating an indicated force of 4.186 newtons on the elastically deformable skin sensing surface.

This same process can be extended to multiple forces operating singly or in combination, such as 1, 2, 5, 10 newton's of downforce, −10, −5, −2, −1, 0, 1, 2, 5, and 10 newton's of shear in X, −10, −2, 2 and 10 newton's of shear in Y, and −10, −2, +2, and +10 newton's of torque in Z.

Still referring to step 230 of FIG. 2A, it is also reasonable to limit the number of stored XY sets to be evaluated in the weighting, inverse weighting, or linear interpolation; typically, the best-matching (lowest Pythagorean distance) two or three stored XY location sets give the best accuracy for 1-dimensional problems, and four to six for two-dimensional, six to eight for three dimensional, and so on. The methods of the present disclosure as you can see are highly customizable to a user's specific application needs/requirements, all while using very inexpensive components along with using an inexpensive microprocessor to perform, at well above a camera frame rate.

Still referring to step 230 of FIG. 2A, experimentation showed that for elastically deformable skin on a scale between 300 and 1000 mesh points (each with three degrees of freedom) would need for adequate fidelity in a linear finite element model (and many more if nonlinearities are allowing). Which meant that the computational phase includes solving up to a 3000×3000 system of linear equations at the video camera frame rate, which is certainly expensive computationally, if not outright impossible with current conventional tactile sensor technologies.

Figure 2C:
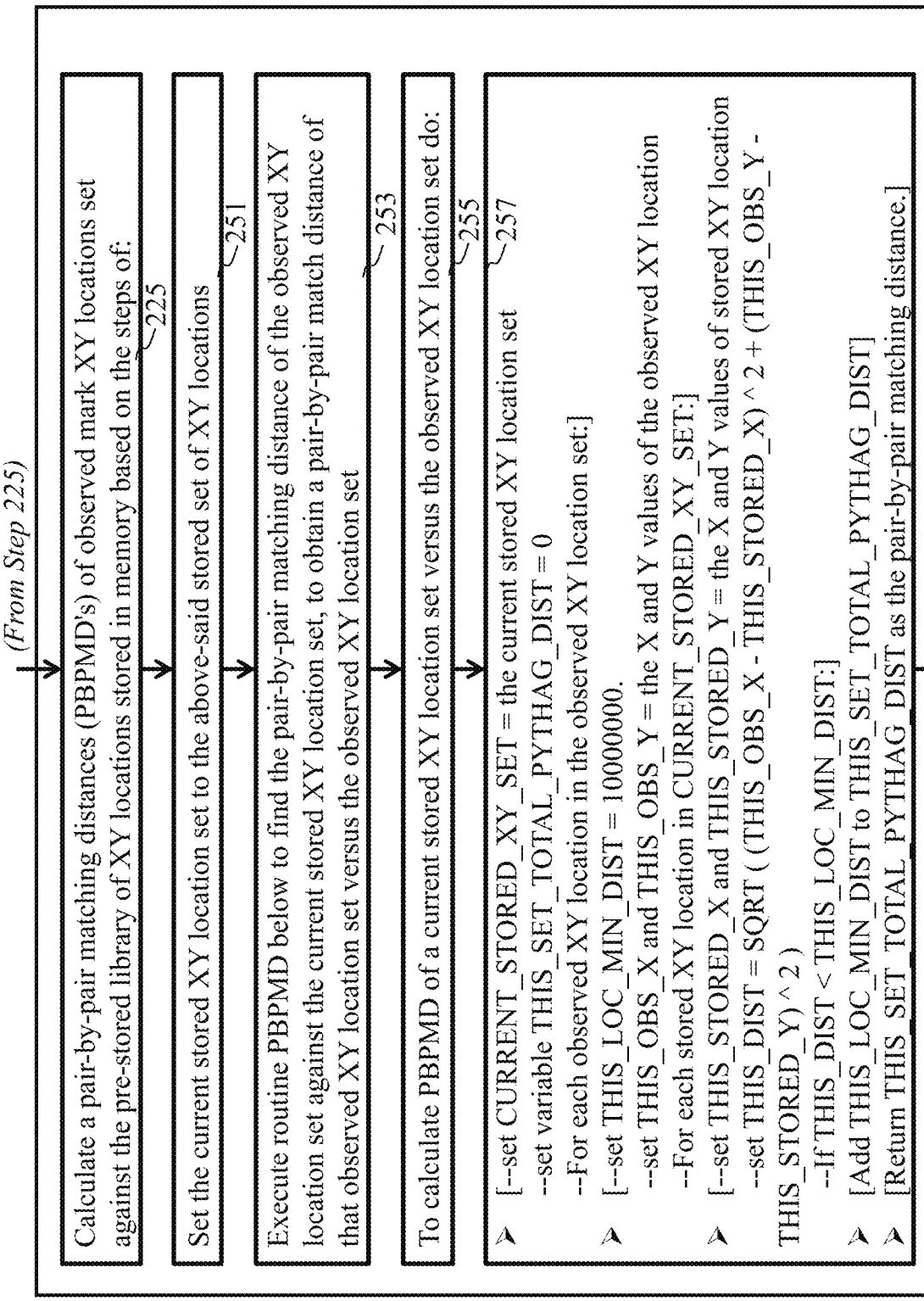
FIG. 2C is a block diagram illustrating some steps for conducting a pair-by-pair matching of the set of observed fiducial mark XY locations against a pre-stored library of XY locations stored in memory of step 225 of FIG. 2A, according to some embodiments of the present disclosure.

FIG. 2C is a block diagram illustrating some steps for conducting a pair-by-pair matching (step 225 of FIG. 2A) of the set of observed fiducial mark XY locations against a pre-stored library of XY locations stored in memory of step 225 of FIG. 2A, according to some embodiments of the present disclosure. Calculate a pair-by-pair matching distances (PBPMD's) of observed mark XY locations set against the pre-stored library of XY locations stored in memory based on the steps of:

Step 251 of FIG. 2C includes Set the current stored XY location set to the above-said stored set of XY locations.

Step 253 of FIG. 2C includes Execute routine PBPMD below to find the pair-by-pair matching distance of the observed XY location set against the current stored XY location set, to obtain a pair-by-pair match distance of that observed XY location set versus the observed XY location set.

Step 255 of FIG. 2C includes to calculate PBPMD of a current stored XY location set versus the observed XY location set do:

Step 257 of FIG. 2C includes:
[--set CURRENT_STORED_XY_SET=the current stored XY location set
 --set variable THIS_SET_TOTAL_PYTHAG_DIST=0
 --For each observed XY location in the observed XY location set:]
[--set THIS_LOC_MIN_DIST=10000000.
 --set THIS_OBS_X and THIS_OBS_Y=the X and Y values of the observed XY location
 --For each stored XY location in CURRENT_STORED_XY_SET:]
>[--set THIS_STORED_X and THIS_STORED_Y=the X and Y values of stored XY location
 --set THIS_DIST=SQRT ((THIS_OBS_X−THIS_STORED_X)^2+(THIS_OBS_Y−THIS_STORED_Y)^2)
 --If THIS_DIST<THIS_LOC_MIN_DIST:]
>[Add THIS_LOC_MIN_DIST to THIS_SET_TOTAL_PYTHAG_DIST]
>[Return THIS_SET_TOTAL_PYTHAG_DIST as the pair-by-pair matching distance.]

Figure 2D:
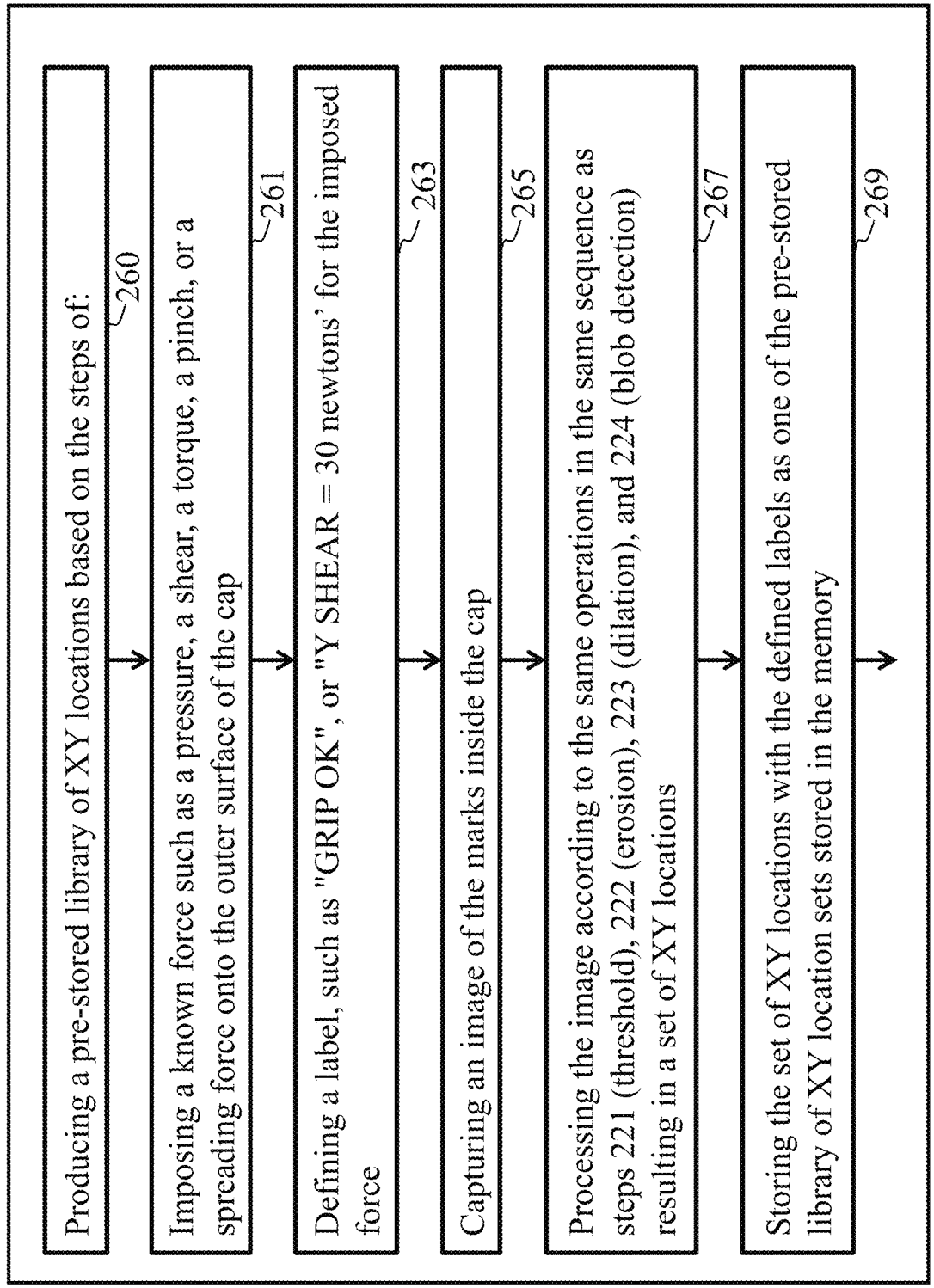
FIG. 2D is a block diagram illustrating some steps for producing a prestored library of XY locations, according to some embodiments of the present disclosure.

FIG. 2D is a block diagram illustrating some steps for producing a prestored library of XY locations, according to some embodiments of the present disclosure. Producing a prestored library of XY locations 260 can include step 261 that includes imposing a known force such as a pressure, a shear, a torque, a pinch, or a spreading force onto the outer surface of the cap.

Step 263 of FIG. 2D includes defining a label, such as "GRIP OK", or "Y SHEAR=30 newtons" for the imposed force.

Step 265 of FIG. 2D includes capturing an image of the marks inside the cap.

Step 267 of FIG. 2D includes processing the image according to the same operations in the same sequence as steps 221 (threshold), 222 (erosion), 223 (dilation), and 224 (blob detection) resulting in a set of XY locations.

Step 269 of FIG. 2D includes storing the set of XY locations with the defined labels as one of the pre-stored library of XY location sets stored in the memory.

Figure 2E:
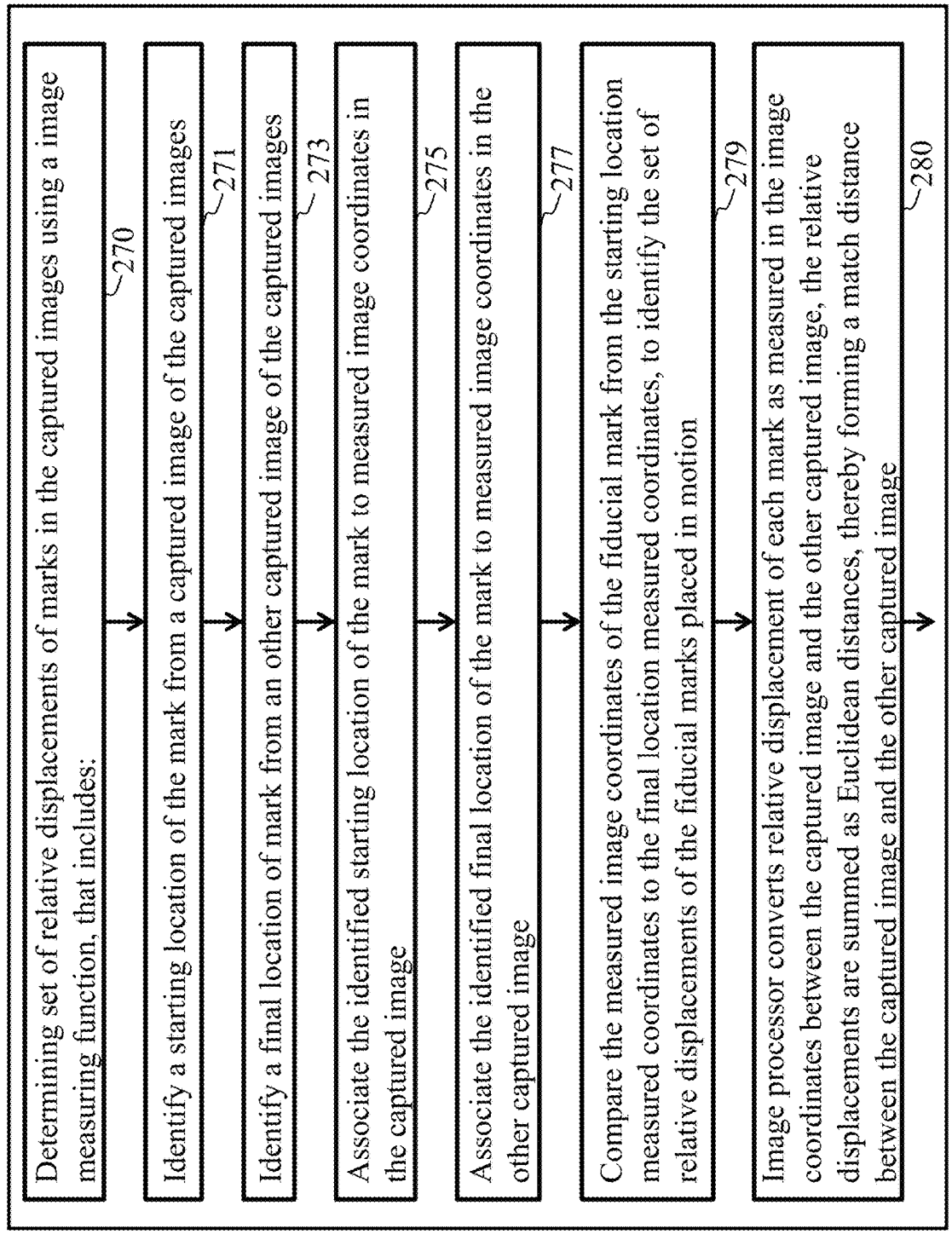
FIG. 2E is a block diagram illustrating some steps for using an image measuring function, according to some embodiments of the present disclosure.

FIG. 2E is a block diagram illustrating some steps for using an image measuring function 270, according to some embodiments of the present disclosure. Step 271 that includes identifying a starting location of the mark from a captured image of the captured images.

Step 273 of FIG. 2E includes identifying a final location of mark from an other captured image of the captured images.

Step 275 of FIG. 2E includes associating the identified starting location of the mark to measured image coordinates in the captured image.

Step 277 of FIG. 2E includes associating the identified final location of the mark to measured image coordinates in the other captured image.

Step 279 of FIG. 2E includes comparing the measured image coordinates of the fiducial mark from the starting location measured coordinates to the final location measured coordinates, to identify the set of relative positions of the fiducial marks placed in motion.

Step 280 of FIG. 2E includes using the image processor to convert the relative position of each mark as measured in the image coordinates between the captured image and the other captured image, the relative positions are summed as Euclidean distances, thereby forming a match distance between the captured image and the other captured image.

Figure 3A:
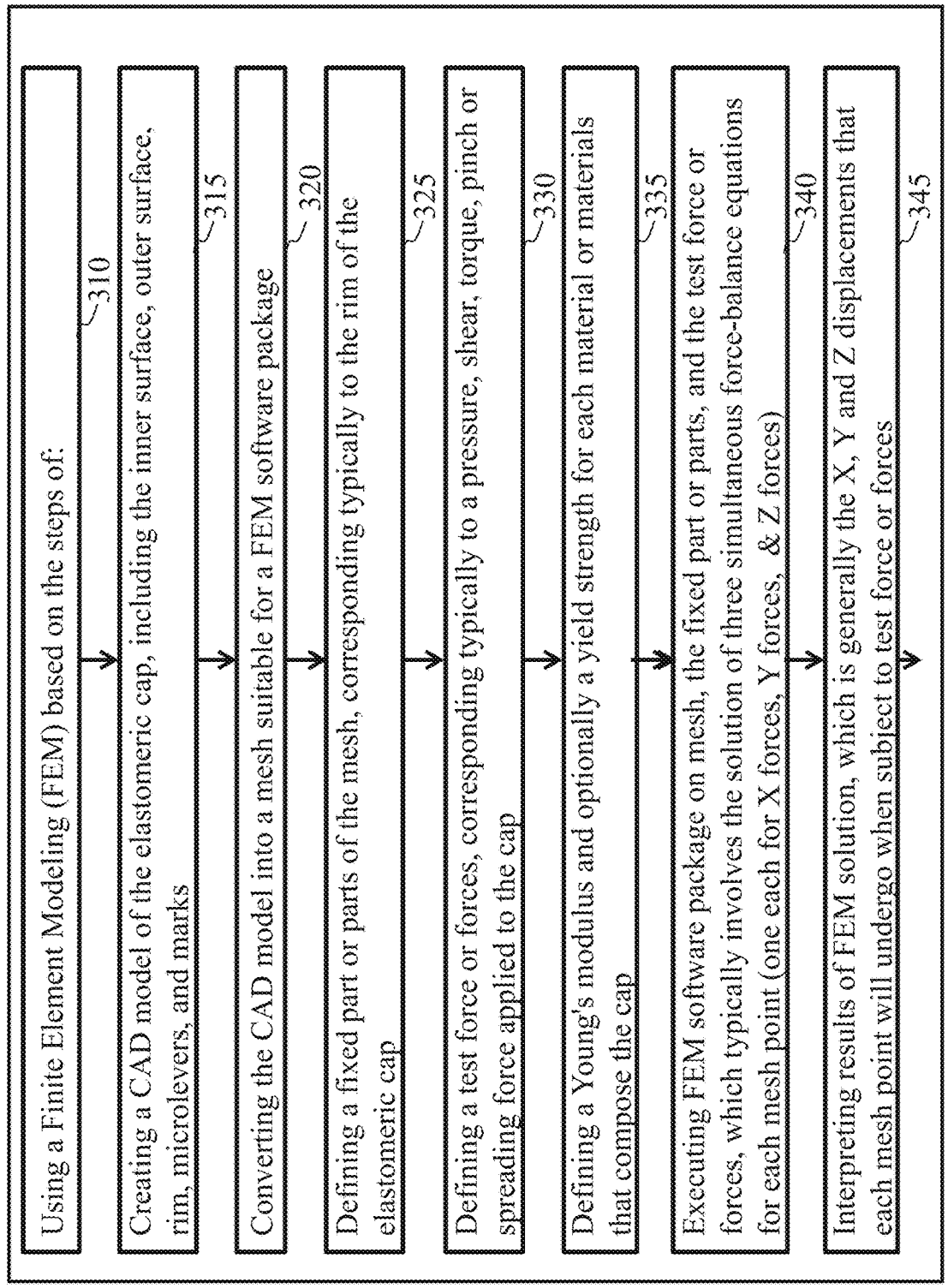
FIG. 3A is a flow diagram illustrating some steps of a Finite Element Modeling (FEM), according to some embodiments of the present disclosure.

FIG. 3A is a flow diagram illustrating some steps of using a Finite Element Modeling (FEM) 310, according to some embodiments of the present disclosure. The FEM is an excellent venue to show or illustrate that a measure of sensitivity of the elastic deformation of the top surface of the elastomeric cap is magnified and greater using the multiple pins on the undersurface of the elastomeric cap, when compared to an amount of measurable sensitivity of a motion of the deflection of "only" the outer impact surface of the elastomeric cap. For example, Step 315 that includes creating a CAD model of the elastomeric cap, including the inner surface, outer surface, rim, microlevers, and marks.

Step 320 of FIG. 3A includes converting the CAD model into a mesh suitable for a FEM software package.

Step 325 of FIG. 3A includes defining a fixed part or parts of the mesh, corresponding typically to the rim of the elastomeric cap.

Step 330 of FIG. 3A includes defining a test force or forces, corresponding typically to a pressure, shear, torque, pinch or spreading force applied to the cap.

Step 335 of FIG. 3A includes defining a Young's modulus and optionally a yield strength for each material or materials that compose the cap.

Step 340 of FIG. 3A includes executing the FEM software package on the mesh, the fixed part or parts, and the test force or forces, which typically involves the solution of three simultaneous force-balance equations for each mesh point (one each for X forces, Y forces, and Z forces).

Step 345 of FIG. 3A includes interpreting the results of the FEM solution, which is generally the X, Y and Z displacements that each mesh point will undergo when subject to the test force or forces.

Figure 3C:
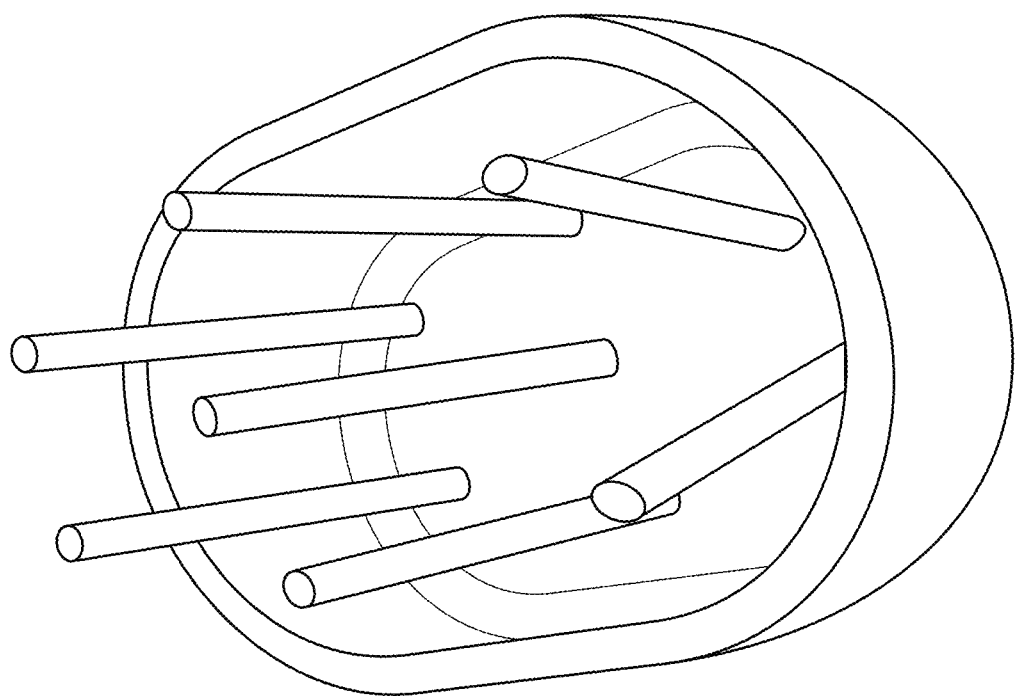
FIG. 3B and FIG. 3C are schematic diagrams illustrating aspects of the using the FEM of FIG. 3A, according to some embodiments of the present disclosure.
Figure 3B:
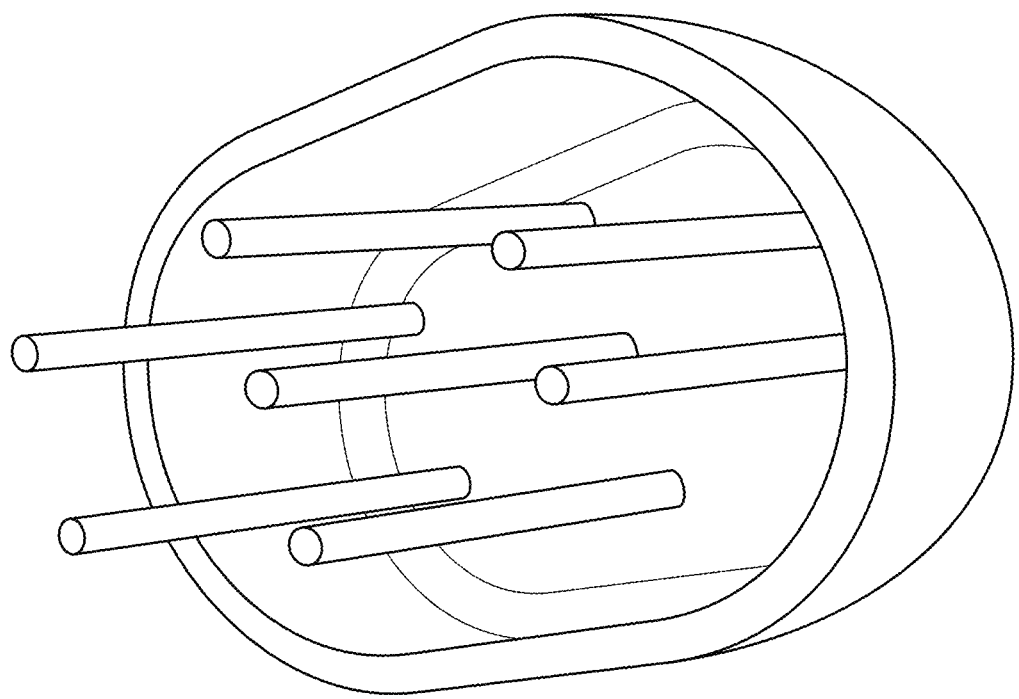

FIG. 3B and FIG. 3C are schematic diagrams illustrating aspects of the using a Finite Element Modeling (FEM) of FIG. 3A, according to some embodiments of the present disclosure. For example, FIG. 3B illustrates a CAD model of an elastomeric cap, with the mesh of fine lines showing the mesh that will be used for Finite Element Modeling. Within each short line in the mesh, the behavior of the material is assumed to be linear.

FIG. 3C illustrates the results of the FEM solution of the CAD model in 3B, with the material set to be an elastomer, with Shore durometer stiffness of 80A (approximately equal to the rubber used in the soles of hiking boots), the fixed part of the mesh being the rim of the cap, and the test force being vertically UP under the rightmost foreground microlever pin. Note that although the rightmost foreground microlever tip has a large motion, the adjacent left foreground microlever tip has an even larger motion. This is due to the tip and tilt distortion in the cap due to the stress of the test force. The base of the left microlever moves much less vertically than the base of the right microlever, but the overall motion is far greater, and the motion is mostly in the −X direction. This makes disambiguation of different forces possible.

Figure 4A:
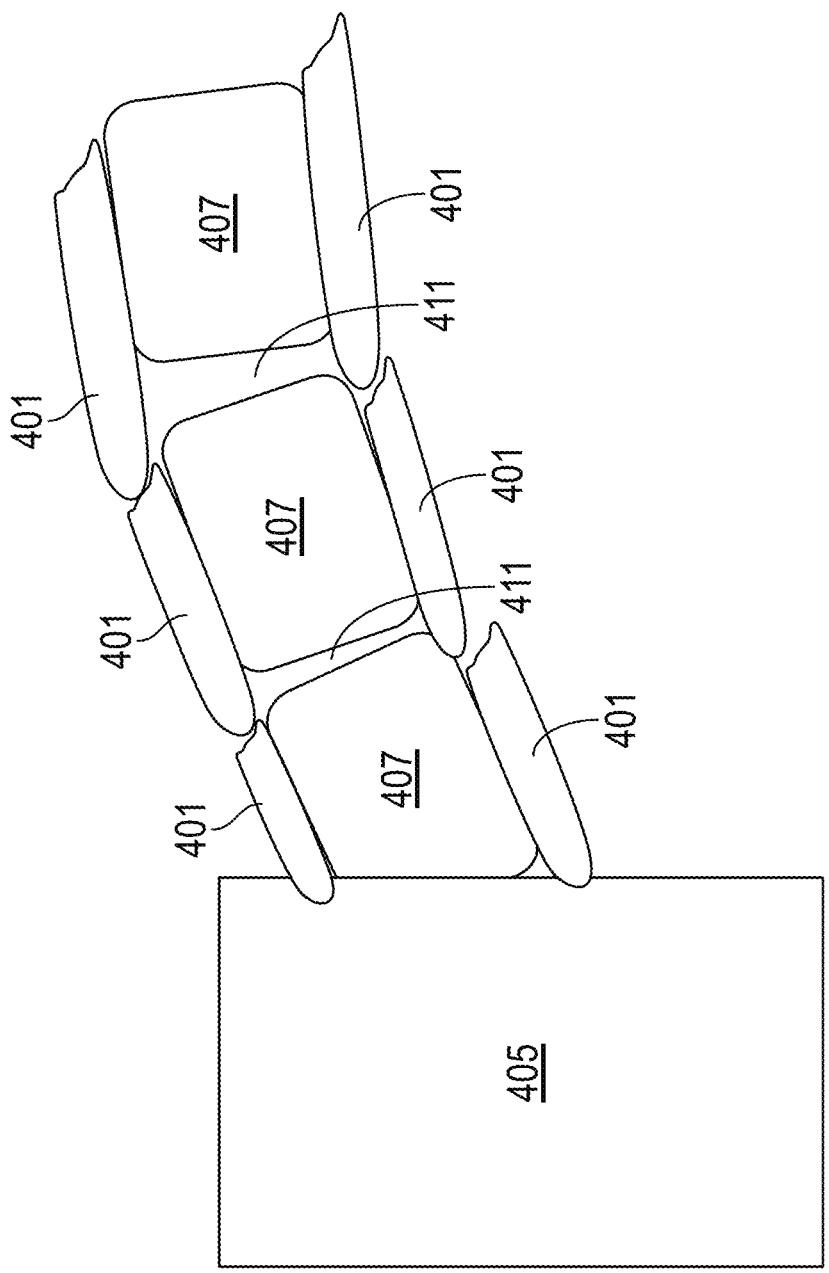
FIG. 4A is a schematic diagram illustrating some components for using the elastically deformable skin along links of a robot assembly, according to some embodiments of the present disclosure.

FIG. 4A is a schematic diagram illustrating some components for using the elastically deformable skin deployed on a moveable robot assembly, according to some embodiments of the present disclosure. The robot consisting of a robot base 405 with one or more links or segments 407 linked by articulations 411 that are axially revolute joints. Multiple elastically deformable skin 401 attached to various locations on each link or segment 407 of the robot. The elastically deformable skin 401 may be shaped to protrude over the articulations 411 without interfering with the motion of articulations 411.

Figure 4B:
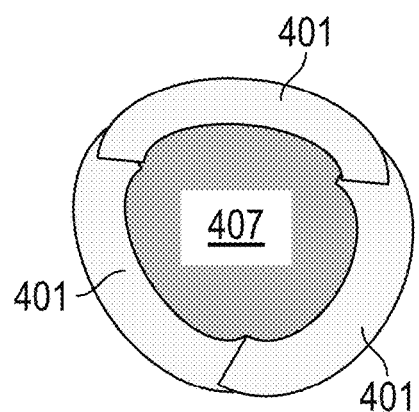
FIG. 4B is a schematic diagram illustrating a cross sectional view of the elastically deformable skin attached to a link of a robot, according to some embodiments of the present disclosure.

FIG. 4B is a schematic diagram illustrating a cross sectional view of the elastically deformable skin 401 deployed on a link or segment 407 of the moveable robot, according to some embodiments of the present disclosure. A cross-sectional view of the link 407 and elastically deformable skin 401 illustrates the use of multiple elastically deformable skins 401 disposed over the surfaces of the link or segment 407 of the robot, so as to provide spatial information about any point(s) of contact during impact or collisions with external objects.

Figure 4C:
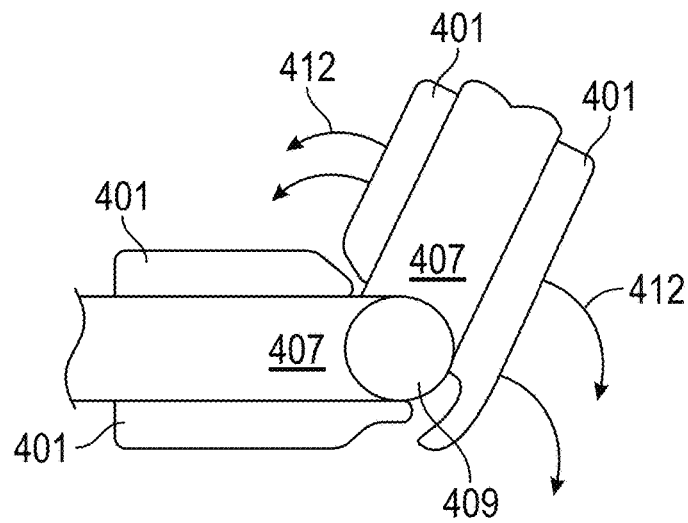
FIG. 4C is a schematic diagram illustrating the elastically deformable skin configured to a joint of a robot, according to some embodiments of the present disclosure.

FIG. 4C is a schematic diagram illustrating the elastically deformable skin 401 configured to a joint 409 of a links 407 of the robot, according to some embodiments of the present disclosure. The robot link or segments 407 are connected by hinge articulation 412 in which multiple elastically deformable skins 401 are configured to maintain coverage over the articulation 412, while avoiding contact between the robot links or segments 407 as they change relative position during motion of articulation 412.

Figure 4D:
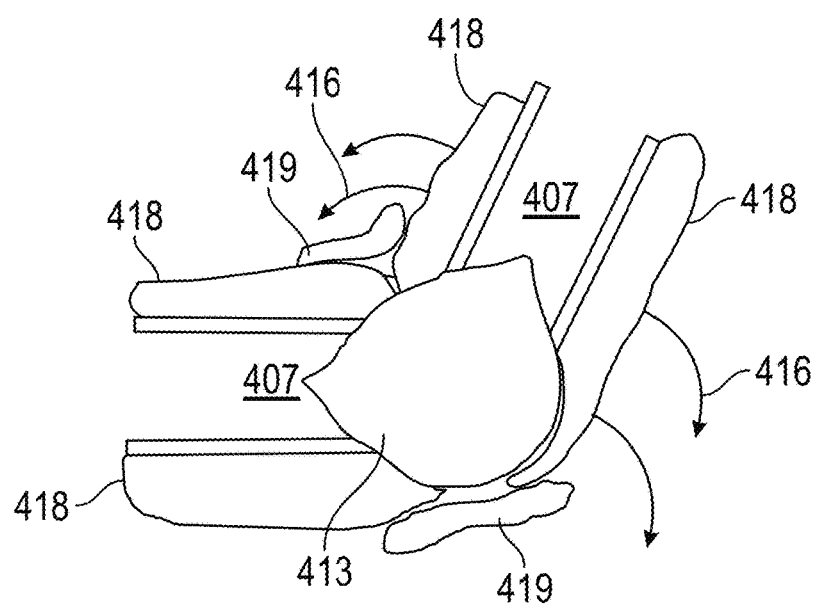
FIG. 4D is a schematic diagram illustrating the elastically deformable skin and an joint adaptor skin configured to another joint of two links or segments a robot, according to some embodiments of the present disclosure.
Figure 4E:
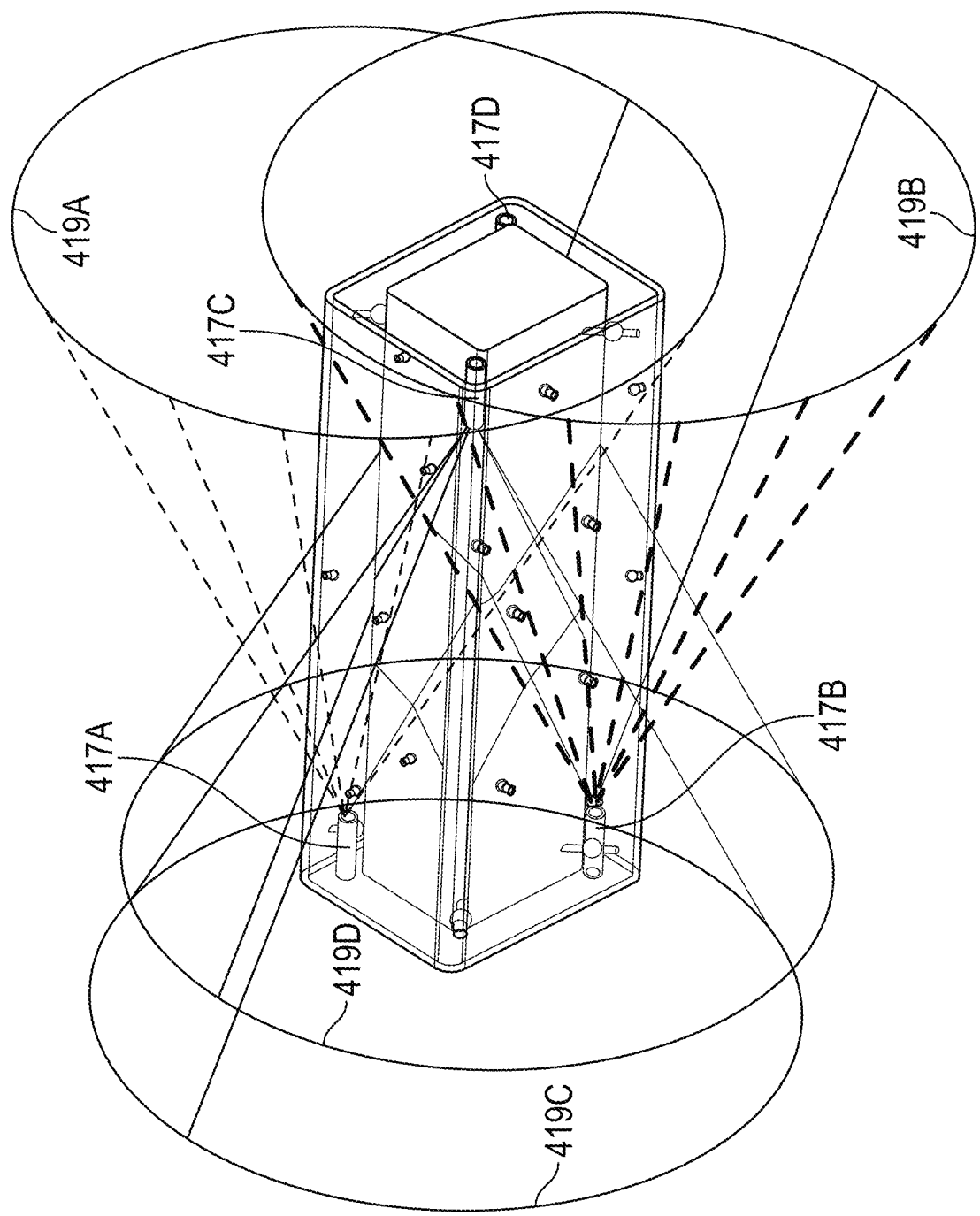
FIG. 4E is a schematic diagram illustrating the multiple views of cameras that are overlapping views of the pins associated with the elastically deformable skin attached to the rigid surface of a robot, according to some embodiments of the present disclosure.

FIG. 4D is a schematic diagram illustrating the elastically deformable skin 418 having an joint adaptor skin 413 configured to another joint of two links or segments 407 a robot, according to some embodiments of the present disclosure. The robot link or segments 407 are connected by hinge articulation 416 in which multiple elastically deformable skins 418 and the joint adaptor skin 413 are configured to maintain coverage over the articulation 416, while avoiding contact between the robot links or segments 407 as they change relative position during motion of articulation 416. The joint adaptor skin 413 includes an addition joint cover adaptor 419, that covers an area between the elastically deformable skins 418.

FIG. 4D is a schematic diagram illustrating the multiple views of cameras that are overlapping views of the pins associated with the elastically deformable skin attached to the rigid surface of a robot, according to some embodiments of the present disclosure. For example the camera 417A-417D have overlapping views, Such that camera 417A has camera view 419 overlaps camera 417B camera view 419B, and camera 417C has camera view 419C overlaps camera 417D camera view 419D. The overlapping views can provide more image data information along with ensuring image data is collected for joint motion between two links of a robot, or for other aspects.

Experimentation

The use of independently moving microlevers also allows different parts of the elastically deformable skin to experience and report back drastically different local strains and forces. For example, part of the elastically deformable skin may be in left-to-right shear, an other side of the elastically deformable skin may be in right-to-left shear, and because the microlevers move freely rather than (not) being captive in a continuous gel, the custom configuration of the elastically deformable skin can correctly detect this situation as a surface torque rather than being insensitive (i.e. the continuous gel) to that particular set of forces, like that as a hemispherical gel would be insensitive to these particular set of forces.

Several experiments were undertaken in order to take advantage of these microlever-amplified fiducial mark motions to generate a force signal output. Some aspects considered including structurally arranging a fixed camera at different positions within a cavity that the component, robot, vehicle or machine is positioned within.

Based on experimentation, when having one or more video camera positioned with a viewing angle between zero and twenty degrees (zero to ~20), i.e. oblique angle, this one or more video camera arrangement resulted in a low profile highly sensitive elastomeric tactile sensor. Some benefits and advantages of the low profile elastomeric sensor of the present disclosure, by non-limiting example, provides for a solution to some of today's technological problems of conventional tactile sensors that have large profile(s). For example, the low profile elastomeric sensor of the present disclose is suitable not only for the robot industry, but also for applications, by non-limiting example, related to the vehicle industry, and the machine industry.

Many tests were conducted to determine how to design and structure the elastically deformable skin based a level of sensitivity, durability, and the ability to be fabricated. For example, a sensor reviewed via public documents was a GelSight sensor. This sensor used a thick block of clear gel with a flexible opaque coating on one side. The coated side of the block was pressed against a surface and the distorted paint was observed perpendicularly, while illuminated under several different angles of grazing illumination. What was learned is that this sensor was capable for finding upward-jutting textures (burrs) on a surface. However, this Gelsight sensor appeared not to be useful for voids or pinholes, such that the sensor had a very low level of damage force threshold. Another disadvantage, among many discovered, is that this Gelsight sensor required about 100 mm Z-axis clearance for the camera to operate. Which, due to such a large clearance for the camera meant that this sensor certainly was not capable of having a low profile configuration, and appeared to be better suited for robotic inspection of textured surfaces, rather than for any type of low profile applications. In addition, the low level of force damage threshold and surface wear made this Gelsight sensor not suitable for many applications.

Based on the extensive experimentation, and desired level of sensitivities, durability, costs of manufacture, and other factors, many realizations were obtained for designing and constructing some embodiments of the present disclosure. Some of these realizations for some embodiments included having the pins extend on an underside of the elastically deformable skin in a manner that the pins extend away from the underside. This configuration included having to design a pin that met a level of strength, but also met a level of deformability in order to be capable of deforming to record amounts of deformation of the pin due to external force tensor. In particular, some configurations of the pins were specifically designed not to keep the pins parallel with other pins. For example, discovered from public documents on experimentation via an optical flow analysis, pins were arranged parallel in an experimental elastically deformable skin. The pin exhibited a certain level of strength, i.e. a level of strength that impinged on the deformity of the pins when an applied external force was exerted. This experimental elastically deformable skin resulted in an acceptable measurable level of a perpendicular force. However, this same experimental elastically deformable skin configuration failed in providing an acceptable level of measurable shear and torque sensing/force, based on image motion obtained with a perpendicular (z-axis) camera of the pin tips. What was learned from this experimental configuration is that a level of pin strength must not be too high a level of strength, to restrict a level of pin deformability, to achieve a measurable force tensor, at least in view of the desired level of measurable sensitivity goals of the present disclosure. Also learned from this experimentation, is that keeping pins substantially parallel in combination with a too high a level of strength of the pin, resulted in impinging the pin deformity, which resulted in an experimental pin configuration insensitive to shear (X and Y pressure), insensitive to torques in X, Y & Z as well as insensitive to pinch forces in X and Y.

The number of pins to be mounted/attached/molded to the underside of the elastomeric elastically deformable skin, can depend on many factors (as learned from experimentation), for example, is that what was realized is that the number of pins can be dependent on a specific application based upon a user intention and goal(s), in terms of achieving a predetermined level of sensitively, durability, etc.

For example, the applied external forces, i.e. full force tensor, applied at an outer impact surface of the elastomeric elastically deformable skin (perpendicular "Z" pressures, both centered and offset, lateral "X" and "Y" shears, and torques in pitch, yaw, and roll)) can all be sensed by the elastomeric tactile sensor. The simple, compact tactile sensor designs of the present disclosure can be used with robotic, prosthetic applications, computer applications, Human-Safe Cooperative Robot Safety Sensors, machine applications and automotive related applications. Further, the high-resolution tactile sensors of some of the embodiments of the present disclosure are also useful for accurate control devices such as high-density miniature computer products, for highly sensitive robotic elastically deformable skin sensing.

In order to process the data generated from the images of the camera of the pins movement, a Finite Element Modeling (FEM) can be used to process the data of the elastically deformable skin as a metamaterial design. A metamaterial is an object where the internal structure produces a final object whose physical properties (electrical, magnetic, mechanical, thermal) properties are markedly different than the bulk properties of it's constituent "real" materials, i.e. negative F, p, nearly arbitrary speed of light c, Poisson's ratio v or thermal conductivity K. Basically, the FEM model can predict elastomer deformation under different loadings. In addition, the elastomer pins elevate the surface profile and convert surface inclination into an easy-to-image XY motion, i.e. using low cost webcam images of the pin tips. Further, the structural design of the elastically deformable skin with fewer fiducial marks provides for simple image thresholding, no interframe tracking/ambiguity. In fact, it is possible to use OpenCV to track the pin tip's motion that is converted to a force map. This minimizes computational expense and maintains a high frame rate.

During experimentation, an inverse FEM proved to be computationally expensive. What was realized is that training of the model should be with real data. An aspect further learned from experimentation is that using Euclidean distance in a 14-dimensional space to a label situation with grasp position, angular pose, shear and torque, proved beneficial. For example, the computational time was very fast, i.e. an amount of computational cost proved very low, resulting in an ability of processing in real-time with an excellent visualization on one 1 GHz cpu (e.g. Raspberry Pi Zero).

Some technologies the embodiments of the present disclosure can be utilized includes FEM, 3D printing of micromechanical elastomer assemblies, small (5.5 mm diameter) webcams. Wherein the webcams can be bought inexpensively, i.e. $20 or less. The embodiments can also be used for robot protect skins, that will provide validation of impacts.

Some other benefits using the FEM and 3D printing can allow the design and production of an elastically deformable skin have many attributes. For example, some attributes can include providing an elastically deformable skin with a desired amount of sensitivity or damage threshold, or to a particular amount of force directions. Wherein, asymmetry in the elastically deformable skin, pin heights, pin locations, and mounting configurations allows for differentiation between different force directions. In addition, the low profile of the elastically deformable skin can allow the tactile sensor to be used both on a robot, vehicle and machine, and thereby, capturing the correct force tensor for the task being performed. In many cases, computing the actual force tensor may unnecessary, such that a simple comparison of the pin tip positions against a preset library of correct and incorrect images is sufficient to determine a type of impact or collision, or interpolated against a library of known distortions to yield good estimates of the actual force tensor on the sensor in real time.

Other embodiments of the present disclosure also address todays industrial needs by providing benefits such as simple compact tactile sensors at a low-cost, low-mass, along with a shallow-profile, while delivering highly sensitive sensing of applied external forces on the elastomeric tactile sensor. Some of these benefits allow for the compact tactile sensor of the present disclosure to be used in technologies where prior conventional use proved too costly for different technological industries.

Figure 5A:
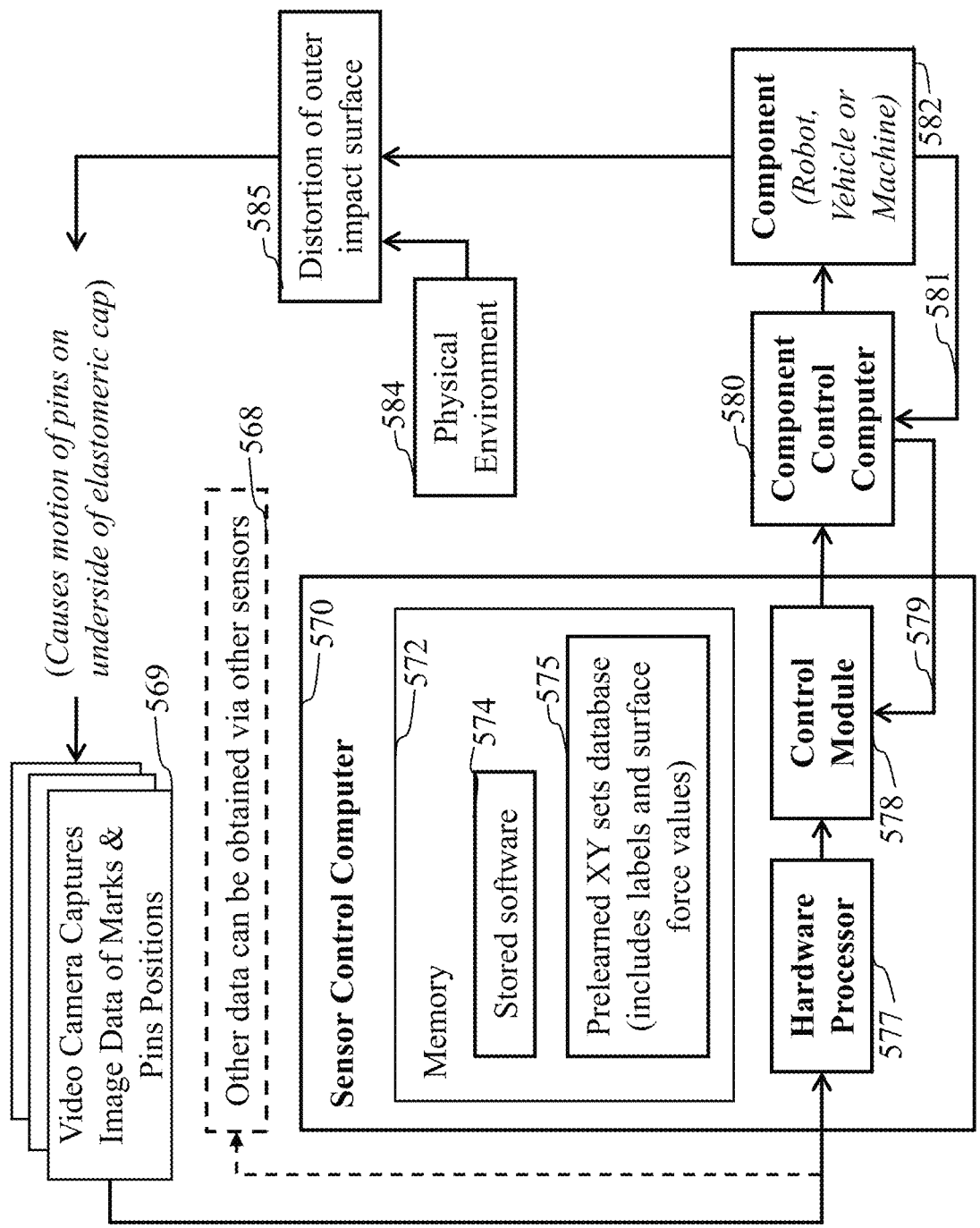
FIG. 5A is a schematic diagram illustrating some components of an alternate robotic system that includes a robot with a gripper with the elastically deformable skin and various subsystems, according to some embodiments of the present disclosure.

FIG. 5A is a schematic diagram illustrating some components of an alternate robotic system that includes a robot with a gripper with the elastically deformable skin and various subsystems, according to some embodiments of the present disclosure. For example, FIG. 5A can include a sensor control computer 570 connected to a robot 582, according to some embodiments of the present disclosure. The sensor control computer 570 can include a hardware processor 577 connected a memory 572 that includes stored software 574 and prelearned XY sets database that includes labels and surface force values. The hardware processor 577 can implement or execute stored instructions that are stored in memory 572. The processor 577 is connected the control module 578 which is connected to the robot control computer 580. The robot control computer 580 can communicate back with the control module via 579. The robot control computer 580 is connected to the robot 582, wherein the robot 582 is connected back to the robot control computer 580.

Still referring to FIG. 5A, the robot 582 is connected to the distortion of outer impact surface 585, wherein the physical environment 584 is connected to the distortion of outer impact surface 585. The physical environment 584 provides input including an object. Further, the distortion of the outer impact surface 585 can be exterior pressures or forces making up a pattern of forces or a net force tensor that causes motion of the pins. Wherein at least one video camera 569 captures images of the marks and pins positions to obtain video image data. For example, the distortion of the outer impact surface 585 can be from exterior pressures, forces and the like, being applied to the outer impact surface 16 of FIG. 1A. The external or exterior pressures, forces and the like, can be a pattern of forces that embodiments of the present disclosure can determine an amount of measurable sensitivity for each pressure or force of the pattern of forces being externally applied to the outer impact surface 16 of FIG. 1A.

Still referring to FIG. 5A, optionally, other data can be obtained from other sensors to the hardware processor 577. For example, the other data can include environmental data, historical data, or data related to implementing robot actions.

Figure 5B:
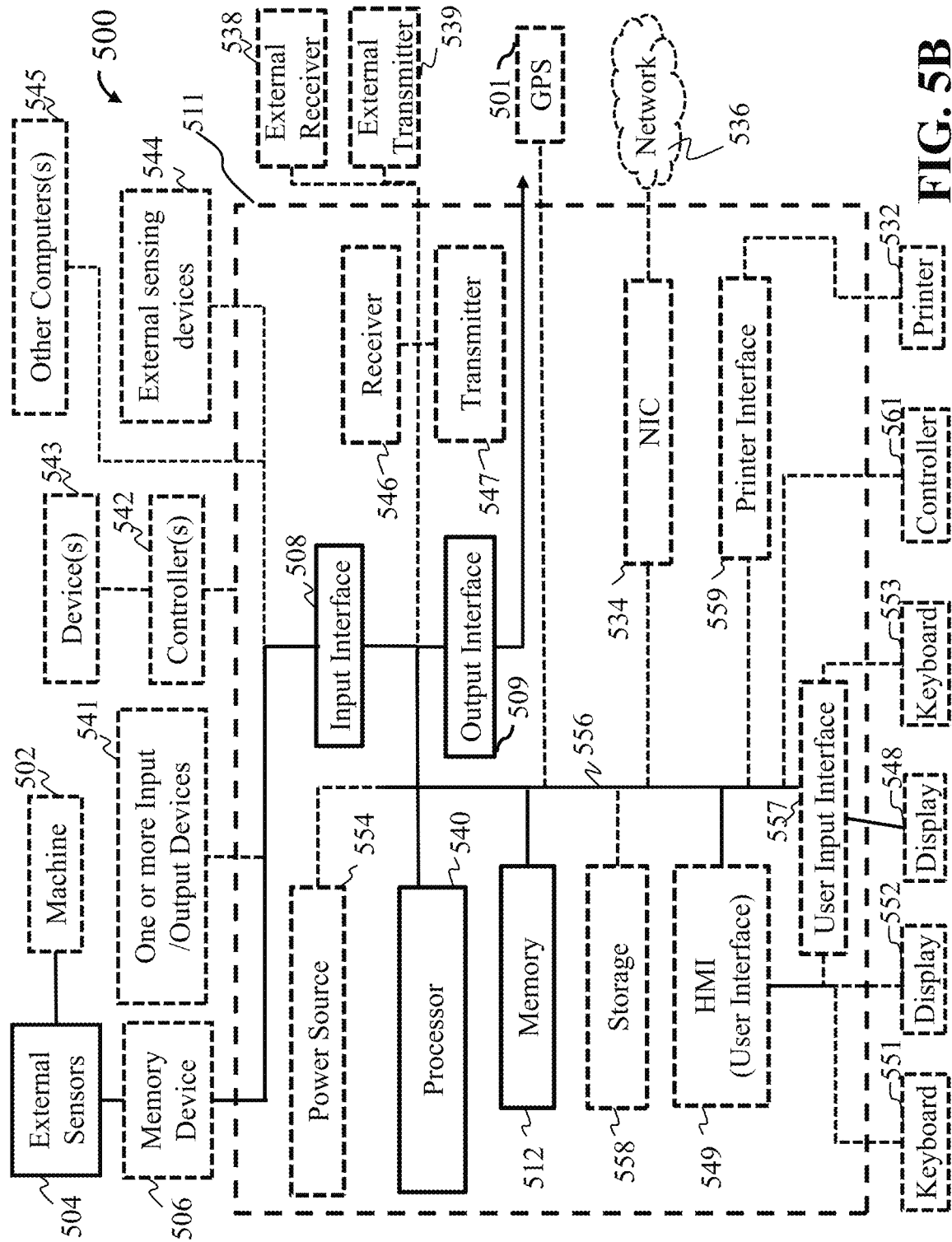
FIG. 5B is a schematic diagram illustrating an alternate processor, according to some embodiments of the present disclosure.

FIG. 5B is a schematic illustrating by non-limiting example a computing apparatus 500 that can be used to implement some techniques of the methods and systems, according to embodiments of the present disclosure. The computing apparatus or device 500 represents various forms of digital computers, such as laptops, desktops, workstations, personal digital assistants, servers, blade servers, mainframes, and other appropriate computers.

The computing device 500 can include a power source 708, a processor 509, a memory 510, a storage device 511, all connected to a bus 550. Further, a high-speed interface 512, a low-speed interface 513, high-speed expansion ports 514 and low speed connection ports 515, can be connected to the bus 550. In addition, a low-speed expansion port 516 is in connection with the bus 550. Contemplated are various component configurations that may be mounted on a common motherboard, by non-limiting example, 530, depending upon the specific application. Further still, an input interface 517 can be connected via bus 550 to an external receiver 506 and an output interface 518. A receiver 519 can be connected to an external transmitter 507 and a transmitter 520 via the bus 550. Also connected to the bus 550 can be an external memory 504, external sensors 503, machine(s) 502 and an environment 501. Further, one or more external input/output devices 505 can be connected to the bus 550. A network interface controller (NIC) 521 can be adapted to connect through the bus 550 to a network 522, wherein data or other data, among other things, can be rendered on a third party display device, third party imaging device, and/or third party printing device outside of the computer device 500.

Contemplated is that the memory 510 can store instructions that are executable by the computer device 500, historical data, and any data that can be utilized by the methods and systems of the present disclosure. The memory 510 can include random access memory (RAM), read only memory (ROM), flash memory, or any other suitable memory systems. The memory 510 can be a volatile memory unit or units, and/or a non-volatile memory unit or units. The memory 510 may also be another form of computer-readable medium, such as a magnetic or optical disk.

Still referring to FIG. 5B, a storage device 511 can be adapted to store supplementary data and/or software modules used by the computer device 500. For example, the storage device 511 can store historical data and other related data as mentioned above regarding the present disclosure. Additionally, or alternatively, the storage device 511 can store historical data similar to data as mentioned above regarding the present disclosure. The storage device 511 can include a hard drive, an optical drive, a thumb-drive, an array of drives, or any combinations thereof. Further, the storage device 511 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 509), perform one or more methods, such as those described above.

The system can be linked through the bus 550 optionally to a display interface or user Interface (HMI) 523 adapted to connect the system to a display device 525 and keyboard 524, wherein the display device 525 can include a computer monitor, camera, television, projector, or mobile device, among others.

Still referring to FIG. 5B, the computer device 500 can include a user input interface 517 adapted to a printer interface (not shown) can also be connected through bus 550 and adapted to connect to a printing device (not shown), wherein the printing device can include a liquid inkjet printer, solid ink printer, large-scale commercial printer, thermal printer, UV printer, or dye-sublimation printer, among others.

The high-speed interface 512 manages bandwidth-intensive operations for the computing device 500, while the low-speed interface 513 manages lower bandwidth-intensive operations. Such allocation of functions is an example only. In some implementations, the high-speed interface 512 can be coupled to the memory 510, a user interface (HMI)

523, and to a keyboard 524 and display 525 (e.g., through a graphics processor or accelerator), and to the high-speed expansion ports 514, which may accept various expansion cards (not shown) via bus 550. In the implementation, the low-speed interface 513 is coupled to the storage device 511 and the low-speed expansion port 515, via bus 550. The low-speed expansion port 515, which may include various communication ports (e.g., USB, Bluetooth, Ethernet, wireless Ethernet) may be coupled to one or more input/output devices 505, and other devices a keyboard 524, a pointing device (not shown), a scanner (not shown), or a networking device such as a switch or router, e.g., through a network adapter.

Still referring to FIG. 5B, the computing device 500 may be implemented in a number of different forms, as shown in the figure. For example, it may be implemented as a standard server 526, or multiple times in a group of such servers. In addition, it may be implemented in a personal computer such as a laptop computer 527. It may also be implemented as part of a rack server system 528. Alternatively, components from the computing device 500 may be combined with other components in a mobile device (not shown). Each of such devices may contain one or more of the computing device and the mobile computing device, and an entire system may be made up of multiple computing devices communicating with each other.

Features

According to another embodiment of the present disclosure, a method a tactile sensor, including an elastically deformable skin including an outer impact surface having attributes and an undersurface having pins, ridges, or both, each undersurface pin or ridge includes a mark, and the undersurface is arranged on flexible spacers from a rigid surface. A camera positioned to capture images of the marks. A memory having stored data including image data of sets of prelearned positions of marks with corresponding prelearned patterns of forces. Each set of prelearned positions of marks corresponds to a prelearned pattern of forces. An image processor operatively connected to the camera and the memory. The image processor is configured to detect displacement of the marks in captured images. Compare the displaced positions of the marks in the captured images to the sets of the prelearned positions of marks, based on a distance function, to determine a quality of match value for each set of the prelearned positions of marks. Determine a best quality matched prelearned pattern of forces using a user selected best matching function, that is applied to the determined quality of match values, to calculate a best matching set of the prelearned positions of marks and the corresponding best quality matched prelearned pattern of forces. Identify a pattern of forces acting on the elastically deformable skin based on the determined best-matched prelearned pattern of forces. Output the identified pattern of forces to initiate an action based on the identified pattern. Wherein the following aspects below are contemplated as configuring a modified embodiment of the above embodiment.

According to aspects of the present disclosure, the attributes include one or a combination of at least one texture, symmetrical protuberances, non-symmetrical protuberances, or a pattern of protuberances with or without the at least one texture, and are structured and arranged in combination with the undersurface pins, ridges, or both, to provide user preferred measurable sensitivities of the pattern of forces, according to a user measurable forces specific application At least one benefit of the aspect can be adding a further amount of sensitivity to the tactile sensor.

An another aspect can include the attributes are structured and arranged to include at least one region of a rough texture that provides user preferred increase and uniform measurable sensitivities of the pattern of forces including detecting an amount of measurable perpendicular forces to the outer impact surfaces across the elastomeric tactile sensor, according to a user measurable forces specific application. Another aspect can be the attributes are structured and arranged to include at least one region of a rough texture that provides user preferred increase and uniform measurable sensitivities of the pattern of forces including detecting an amount of measurable perpendicular forces to the outer impact surfaces across the elastomeric tactile sensor, according to a user measurable forces specific application. Further, another aspect can include the attributes are structured and arranged to include one or a combination of cone shape protuberances, symmetrical protuberances or non-symmetrical protuberances, that provide user preferred increase of measurable sensitivities of the pattern of forces including detecting an amount of measurable in-plane forces, shear forces and torque forces, to the outer impact surfaces across the elastomeric tactile sensor, according to a user measurable forces specific application. Another aspect includes the attributes are structured and arranged to include at least one region of ridge-like protuberances positioned perpendicular to an axis of user preferred measureable sensitivities to measurable forces or torques of the pattern of forces, according to a user measurable forces specific application. An aspect is the attributes include a customized pattern of one or a combination of a rough texture, cone shape protuberances, symmetrical protuberances, non-symmetrical protuberances, ridges like protuberances positioned perpendicular to an axis of a preferred measureable sensitivity, that provides user preferred measurable sensitivities of the pattern of forces, according to a user measurable forces specific application.

Further still, another aspect is when forces are applied to the outer impact surface, the outer impact surface elastically deforms, causing the undersurface pins, ridges or both, to undergo a flexing motion, which displaces the marks. Also, as aspect is the distance function used to compare the displaced positions of the marks to the sets of the prelearned positions of marks, is based on a Euclidean distance function. Further, an aspect is wherein the best matched set of the prelearned positions of marks is determined using the user selected matching function that includes: (1) a best quality of match via the distance function; (2) a predetermined weighted average among a user selected number of best quality of match values via the distance function; or (3) a predetermined weighted sum of all quality of matched values.

Still another aspect is each pattern of forces includes a set of forces perpendicular to the outer impact surface, torque forces and shear forces, such that the pattern of forces acting on the elastically deformable skin includes one or a combination of, a perpendicular pressure Z, a centered pressure, an offset pressure, a lateral force X, a shear force Y, torques in a pitch, a yaw, or a roll, a pinch lateral force X, or a pinch shear force Y. Another aspect is the outer impact surface changes between a undeformed state when no forces are applied to the outer impact surface, and an elastically deformed state when forces are applied to the outer impact surface which elastically deforms the outer impact surface, causing the undersurface pins, ridges or both, to undergo a flexing motion, which displaces the marks, and wherein the image processor compares the displacement of the marks in the captured images by evaluating a relative displacement of the undersurface pins, ridges or both, between the undeformed state and the elastically deformed state.

Another aspect is that the flexible spacers are attached to the undersurface and the rigid surface, and the rigid surface is an outer surface of a robot, a vehicle or machine. Further, an aspect is the identified pattern of forces is outputted to an external controller that executes the action based on the identified pattern, such that the action is related to the robot, the vehicle or the machine, including one or a combination of: (A) a movement of the robot, the vehicle or the machine; (B) a movement of at least one device or element associated with the robot, the vehicle or the machine, such as an action related to opening or closing a gripper of the robot, an action related to maintaining a robot position, an action related to lifting an object or releasing the object by the gripper of the robot. Wherein the action is to slow or stop a movement of the robot, the vehicle or the machine. Also, the elastically deformable skin and the flexible spacers are a unified structure, and the elastically deformable skin includes perforations, slots or ventilation like apertures.

According to another embodiment of the present disclosure, a method a method for tactile sensing including providing an elastically deformable skin including an outer impact surface having attributes and an undersurface having pins, ridges, or both. Each undersurface pin or ridge includes at least one mark, and the undersurface is arranged on flexible spacers, the flexible spacers are attached to a rigid surface of a device. Providing a camera arranged to capture images of the marks, and capture images from the camera. Detecting displacement of the marks in captured images, to obtain displaced positions of the marks. Accessing a memory having stored data that includes image data of sets of prelearned positions of marks with prelearned patterns of forces, each set of prelearned positions of marks corresponds to a prelearned pattern of forces. Comparing the displaced positions of the marks in the captured images to the sets prelearned positions of marks of the image data, based on a distance function, to obtain a quality of match value for each set of the prelearned positions of marks, and apply a user selected best matching function to the quality of match values, to determine a best quality matched prelearned pattern of forces. Identifying a pattern of forces acting on the elastically deformable skin based on the determined best matched prelearned pattern of forces. Wherein the pattern of forces includes one or a combination of, a perpendicular pressure Z, a centered pressure, an offset pressure, a lateral force X, a shear force Y, torques in a pitch, a yaw, or a roll, a pinch lateral force X, or a pinch shear force Y. Outputting the identified pattern of forces to initiate an action based on the identified pattern. Wherein the following aspects below are contemplated as configuring a modified embodiment of the above embodiment.

According to aspects of the present disclosure, is determining the best quality matched prelearned pattern of forces using the user selected best matching function, includes applying the user selected best matching function to the quality of match values, in order to determine a best matching set of the prelearned positions of marks and the corresponding best quality matched prelearned pattern of forces, and wherein the device is a machine including a robot, such that a controlling movement of the robot is initiated in response to the identified pattern of forces acting on the elastically deformable skin.

According to another embodiment of the present disclosure, a method a system for controlling a robot, including an elastically deformable skin including an outer impact surface having attributes and an undersurface having pins, ridges, or both. Each undersurface pin or ridge includes at least one mark, and the undersurface is arranged on flexible spacers, the flexible spacers are attached to a rigid surface of a device. A camera arranged to capture images of the marks. A memory having stored data including image data of sets of prelearned positions of marks with corresponding prelearned patterns of forces, each set of prelearned positions of marks corresponds to a prelearned pattern of forces. An image processor operatively connected to the camera and the memory. The image processor is configured to detect displacement of the marks in captured images. Compare the displaced positions of the marks in the captured images to the sets of the prelearned positions of marks, based on a distance function, to determine a quality of match value for each set of the prelearned positions of marks. Determine a best quality matched prelearned pattern of forces using a user selected best matching function, that is applied to the determined quality of match values, to calculate a best matching set of the prelearned positions of marks and the corresponding best quality matched prelearned pattern of forces. Identify a pattern of forces acting on the elastically deformable skin based on the determined best-matched prelearned pattern of forces. Output the identified pattern of forces to initiate an action based on the identified pattern. Wherein the following aspects below are contemplated as configuring a modified embodiment of the above embodiment.

As aspect includes the determining the best quality matched prelearned pattern of forces using the user selected best matching function, includes applying the user selected best matching function to the quality of match values, in order to determine a best matching set of the prelearned positions of marks and the corresponding best quality matched prelearned pattern of forces, and wherein the device is a machine including a robot, such that a controlling movement of the robot is initiated in response to the identified pattern of forces acting on the elastically deformable skin These aspects below can be incorporated into any of the above device, methods and systems. For example, an aspect can be that the camera includes an illuminating source that illuminates the fiducial marks in order to capture an image of the fiducial marks. Another aspect is the camera is replaced with multiple of cameras that are spaced-apart from each other, at a same viewing angle or at a different viewing angle of fiducial marks, such that the multiple cameras are capable of capturing images of all the fiducial marks at static position before forces are applied to the outer impact surface and at a final position after forces were applied to the outer impact surface in order to capture images to determine a displacement of each mark.

Another aspect is that the marks are fiducial marks or fiducial markers that are of a material including silicone rubber, polyurethane, plastisol, thermoplastic elastomer, natural rubber, polyisoprene, polyvinyl chloride or a mixture thereof. Wherein the marks include a hardness of a Shore a hardness between 5 and 90. Further, an aspect can be that the relative displacement of each mark in the set of marks, is determined based on measured image coordinates at a starting location of a captured image to a final location of a captured image. It is possible an aspect can be that each set of prelearned positions of marks includes data of each fiducial mark based on measured image coordinates at a static state with no applied force to the top surface, and data of each fiducial mark based on measured image coordinates at a static state after an applied force to the top surface.

Some conventional machine vision and ultrasonic proximity sensor approaches may help prevent unwanted collisions, but are subject to high variability in accurately detecting an object before collision. The conventional machine vision systems are subject to errors if the cameras become occluded or if lighting is poor. In such applications where safety and reliability are of high concern, these conventional technologies therefore be less desirable. However, the elastically deformable skin of the present disclosure overcomes these conventional tactile sensor problems (i.e. surfaces are out of view, or there are shadows, poor contrast or poor lighting), by not being susceptible to such conventional problems. Also, in regard to conventional telerobotics, where an operator's mental concentration tires over time, the present disclosure of the elastically deformable skin overcomes such problems, by eliminating the need for telerobotics and human operators.

Definitions

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided.

Tensor: In mathematics, a tensor is an algebraic object related to a vector space and its dual space that can be defined in several different ways, often a scalar, tangent vector at a point, a cotangent vector (dual vector) at a point or a multi-linear map from vector spaces to a resulting vector space. Euclidean vectors and scalars (which are often used in physics and engineering applications where general relativity is irrelevant) are the simplest tensors. While tensors are defined independent of any basis, the literature on physics often refers to them by their components in a basis related to a particular coordinate system.

Finite Element Modeling (FEM): According to some embodiments of the present disclosure the FEM can be the subdivision of a whole domain into simpler parts has several advantages: (A) Accurate representation of complex geometry; (B) Inclusion of dissimilar material properties; (C) Easy representation of the total solution; and (D) Capture of local effects.

A work out of the method can involve (1) dividing the domain of the problem into a collection of subdomains, with each subdomain represented by a set of element equations to the original problem, followed by (2) systematically recombining all sets of element equations into a global system of equations for the final calculation. The global system of equations has known solution techniques, and can be calculated from the initial values of the original problem to obtain a numerical answer.

Still referring to the FEM, in the first step above, the element equations are simple equations that locally approximate the original complex equations to be studied, where the original equations are often partial differential equations (PDE). To explain the approximation in this process, FEM is commonly introduced as a special case of Galerkin method. The process, in mathematical language, is to construct an integral of the inner product of the residual and the weight functions and set the integral to zero. In simple terms, a procedure minimizes the error of approximation by fitting trial functions into the PDE. The residual is the error caused by the trial functions, and the weight functions are polynomial approximation functions that project the residual. The process eliminates all the spatial derivatives from the PDE, thus approximating the PDE locally with a set of algebraic equations for steady state problems, and a set of ordinary differential equations for transient problems.

These equation sets are the element equations. They are linear if the underlying PDE is linear, and vice versa. Algebraic equation sets that arise in the steady state problems are solved using numerical linear algebra methods, while ordinary differential equation sets that arise in the transient problems are solved by numerical integration using standard techniques such as Euler's method or the Runge-Kutta method.

Still referring to the FEM, in step (2) above, a global system of equations is generated from the element equations through a transformation of coordinates from the subdomains' local nodes to the domain's global nodes. This spatial transformation includes appropriate orientation adjustments as applied in relation to the reference coordinate system. The process is often carried out by FEM software using coordinate data generated from the subdomains.

Experimentation

During experimentation, many tests were conducted to determine how to design and structure the elastically deformable skin based a level of sensitivity, and durability. Some experimental tests were conducted with arm motor torque sensors, post-contact validation sensors, wrist force sensors, motor position and torque sensors, and contact strain gauges.

For example, the arm motor torque sensors exhibited inertial, frictional and gravitational forces on the robot. At least one aspect learned is that the inertial, frictional and gravitational forces on the robot usually completely dominate the forces actually experienced during proper mechanical assembly. From the post-contact validation experiments, what was learned is that after the robot executes an operation, the robot moves operationally to a machine vision station to confirm the robot movement. The machine vision station has a machine vision system that validates that the movement, wherein if any corrections are needed, the correction is implemented after the complete movement. However, we realized that detecting movement after the robot moved resulted in damage to the robot along with creating an unsafe environment to other machines, assets and humans. Based on the experimental results this method and methods similar failed to meet a level of cost, safety and acceptable technological solution of the goals of the present disclosure.

From experimenting with the wrist force sensors, what was learned is that these wrist force sensors appeared to be very coarse. For example, the wrist force sensors did not appear to capture offset movements, nor movements failures until a deviation from prior experience is noted, and for many movements or assembly tasks tested, the deviation is less than the inertial, gravitational, and sensor noise impacts on the wrist force sensor. Again, as noted with other experimented tests, these methods or methods similar failed to meet a level of cost, safety and acceptable technological solutions of the goals of the present disclosure.

What was learned from experimenting with the motion strain gauge sensors is that these sensors integrate a strain gauge into a device so only the device forces are registered, which appeared to be equivalent to sensing only "Z" pressure. However, these sensors failed to provide for sensing other forces such as a centered pressure, an offset pressure, a lateral force X, a shear force Y, torques in a pitch, a yaw, or a roll, a pinch lateral force X, or a pinch shear force Y.

Another sensor that was experimented with included a GelSight sensor. This sensor used a thick block of clear gel with a flexible opaque coating on one side. The coated side of the block was pressed against a surface and the distorted paint was observed perpendicularly, while illuminated under several different angles of grazing illumination. What was learned is that this sensor was capable for finding upward-jutting textures (burrs) on a surface. However, this sensor appeared not to be useful for voids or pinholes, such that the sensor had a very low level of damage force threshold. Another disadvantage, among many discovered, is that this sensor required about 100 mm Z-axis clearance for the camera to operate. Which, due to such a large clearance space for the camera meant that this sensor certainly was not be capable of having a low profile configuration, and appeared to be better suited for robotic inspection of textured surfaces, rather than for any type of low profile applications, such as a sensor related to an elastically deformable skin. In addition, the low level of force damage threshold and surface wear made this sensor not suitable for robotic assembly.

Some aspects learned from the different types of sensor experimentation tests, is that robots are used for transporting and assembly, but proper transporting and assembly is dependent on the robot always operating movements exactly at the same position and orientation. Miss-movements by the robot lead to safety to humans, costs related to damage of the robot or costs to damage of other machines or objects, etc. As another example, even if the robot motion is correct, if an object or human un-expectedly enters the robot's path, or some unplanned event occurs causing objects or humans to enter the robot's path, learned from experimentation is that the robot will attempt to force the movement despite the unplanned event, yielding to hurting a human, damaged the robot, or damaging any object in the path of the robot. In view of the above experimental findings the experimented sensors could not be modified or further developed in order to meet the present disclosure desired level of sensitivities, durability, costs of manufacture, among many other factors, and thus, were not further analyzed or tested.

Based on the extensive experimentation, and desired level of sensitivities, durability, costs of manufacture, and other factors, many realizations were obtained for designing and constructing the embodiments of the present disclosure. Some of these realizations for some embodiments included having the pins extend on an undersurface or underside of the elastically deformable skin in a manner that the pins extend away from the undersurface. This configuration included having to design a pin that met a level of strength, but also met a level of deformability in order to be capable of deforming to record amounts of deformation of the pin due to external force tensor. In particular, some configurations of the pins were specifically designed not to keep the pins parallel with other pins. For example, discovered from experimentation via an optical flow analysis, pins were arranged parallel in an experimental elastically deformable skin. The pin exhibited a certain level of strength, i.e. a level of strength that impinged on the deformity of the pins when an applied external force was exerted. This experimental elastically deformable skin resulted in an acceptable measurable level of a perpendicular force. However, this same experimental elastically deformable skin configuration failed in providing an acceptable level of measurable shear and torque sensing/force, based on image motion obtained with a perpendicular (z-axis) camera of the pin tips. What was learned from this experimental configuration is that a level of pin strength must not be too high a level of strength, to restrict a level of pin deformability, to achieve a measurable pattern of forces or net force tensor, at least in view of the desired level of measurable sensitivity goals of the present disclosure. Also learned from this experimentation, is that keeping pins substantially parallel in combination with a too high a level of strength of the pin, resulted in impinging the pin deformity, which resulted in an experimental pin configuration insensitive to shear (X and Y pressure), insensitive to torques in X, Y & Z as well as insensitive to pinch forces in X and Y.

Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further, some embodiments of the present disclosure can be implemented as one or more computer programs, i.e., one or more modules of computer program instructions encoded on a tangible non-transitory program carrier for execution by, or to control the operation of, data processing apparatus. Further still, program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure, the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:
1. A tactile sensor, comprising:
an elastically deformable skin including an outer impact surface having attributes and an undersurface having pins, ridges, or both, each undersurface pin or ridge includes a mark, and the undersurface is arranged on flexible spacers from a rigid surface;
a camera positioned to capture images of the marks;
a memory having stored data including image data of sets of prelearned positions of marks with corresponding prelearned patterns of forces, each set of prelearned positions of marks corresponds to a prelearned pattern of forces;
an image processor operatively connected to the camera and the memory, is configured to:
  detect displacement of the marks in captured images;
  compare the displaced positions of the marks in the captured images to the sets of the prelearned positions of marks, based on a distance function, to determine a quality of match value for each set of the prelearned positions of marks;
  determine a best quality matched prelearned pattern of forces using a user selected best matching function, that is applied to the determined quality of match values, to calculate a best matching set of the prelearned positions of marks and the corresponding best quality matched prelearned pattern of forces;

identify a pattern of forces acting on the elastically deformable skin based on the determined best matched prelearned pattern of forces; and output the identified pattern of forces to initiate an action based on the identified pattern.

2. The tactile sensor of claim 1, wherein the image processor converts the position of each mark in the captured images by identifying measured image coordinates of locations in images of the captured images using an image measuring function.

3. The tactile sensor of claim 2, wherein the detected position of each mark are summed as Euclidean distances between the detected positions of the marks and the prelearned positions of the marks, thereby forming a match distance between the captured image of the mark and the prelearned image of the mark.

4. The tactile sensor of claim 1, wherein the attributes include one or a combination of at least one texture, symmetrical protuberances, non-symmetrical protuberances, or a pattern of protuberances with or without the at least one texture, and are structured and arranged in combination with the undersurface pins, ridges, or both, to provide user preferred measurable sensitivities of the pattern of forces, according to a user measurable forces specific application.

5. The tactile sensor of claim 1, wherein the attributes are structured and arranged to include at least one region of a rough texture, a smooth texture, or both, that provides user preferred increase and uniform measurable sensitivities of the pattern of forces including detecting an amount of measurable perpendicular forces to the outer impact surfaces across the tactile sensor, according to a user measurable forces specific application.

6. The tactile sensor of claim 1, wherein the attributes are structured and arranged to include one or a combination of cone shape protuberances, symmetrical protuberances or non-symmetrical protuberances, that provide user preferred increase of measurable sensitivities of the pattern of forces including detecting an amount of measurable in-plane forces, shear forces and torque forces, to the outer impact surfaces across the tactile sensor, according to a user measurable forces specific application.

7. The tactile sensor of claim 1, wherein the attributes are structured and arranged to include at least one region of ridge-like protuberances positioned perpendicular to an axis of user preferred measureable sensitivities to measurable forces or torques of the pattern of forces, according to a user measurable forces specific application.

8. The tactile sensor of claim 1, wherein, when forces are applied to the outer impact surface, the outer impact surface elastically deforms, causing the undersurface pins, ridges or both, to undergo a flexing motion, which displaces the marks.

9. The tactile sensor of claim 1, wherein the best matched set of the prelearned positions of marks is determined using the user selected matching function that includes: (1) a best quality of match via the distance function; (2) a predetermined weighted average among a user selected number of best quality of match values via the distance function; or (3) a predetermined weighted sum of all quality of matched values, wherein the distance function used to compare the detected positions of the marks to the sets of the prelearned positions of marks is based on a Euclidean distance function.

10. The tactile sensor of claim 1, wherein the pattern of forces acting on the elastically deformable element includes one or a combination of, a perpendicular pressure Z, a centered pressure, an offset pressure, a lateral shear force X, a shear force Y, torques in a pitch, a yaw, or a roll, a pinch lateral force X, a spread lateral force X, a spread lateral force Y, or a pinch shear force Y.

11. The tactile sensor of claim 1, wherein the outer impact surface changes between a undeformed state when no forces are applied to the outer impact surface, and an elastically deformed state when forces are applied to the outer impact surface which elastically deforms the outer impact surface, causing the undersurface pins, ridges or both, to undergo a flexing motion, which displaces the marks, and wherein the image processor compares the displacement of the marks in the captured images by evaluating a relative displacement of the undersurface pins, ridges or both, between the undeformed state and the elastically deformed state.

12. The tactile sensor of claim 1, wherein the flexible spacers are attached to the undersurface and the rigid surface, and the rigid surface is an outer surface of a robot, a vehicle or machine.

13. The tactile sensor of claim 12, wherein the identified pattern of forces is outputted to an external controller that executes the action based on the identified pattern, such that the action is related to the robot, the vehicle or the machine, including one or a combination of: (A) a movement of the robot, the vehicle or the machine; (B) a movement of at least one device or element associated with the robot, the vehicle or the machine, such as an action related to opening or closing a gripper of the robot, an action related to maintaining a robot position, an action related to lifting an object or releasing the object by the gripper of the robot.

14. The tactile sensor of claim 13, wherein the action is to slow or stop a movement of the robot, the vehicle or the machine.

15. The tactile sensor of claim 1, wherein the elastically deformable skin and the flexible spacers are a unified structure, and the elastically deformable skin includes perforations, slots or ventilation like apertures.

16. A method for tactile sensing, comprising:
providing an elastically deformable skin including an outer impact surface having attributes and an undersurface having pins, ridges, or both, each undersurface pin or ridge includes at least one mark, and the undersurface is arranged on flexible spacers, the flexible spacers are attached to a rigid surface of a device;
providing a camera arranged to capture images of the marks;
capture images from the camera;
detecting displacement of the marks in captured images, to obtain displaced positions of the marks;
accessing a memory having stored data that includes image data of sets of prelearned positions of marks with prelearned patterns of forces, each set of prelearned positions of marks corresponds to a prelearned pattern of forces;
compare the displaced positions of the marks in the captured images to the sets prelearned positions of marks of the image data, based on a distance function, to obtain a quality of match value for each set of the prelearned positions of marks, and apply a user selected best matching function to the quality of match values, to determine a best quality matched prelearned pattern of forces;
identifying a pattern of forces acting on the elastically deformable skin based on the determined best matched prelearned pattern of forces, wherein the pattern of forces acting on the elastically deformable element includes one or a combination of, a perpendicular pressure Z, a centered pressure, an offset pressure, a lateral shear force X, a shear force Y, torques in a pitch, a yaw, or a roll, a pinch lateral force X, a spread lateral force X, a spread lateral force Y, or a pinch shear force Y; and outputting the identified pattern of forces to initiate an action based on the identified pattern.

17. The method of claim 16, wherein the determining the best quality matched prelearned pattern of forces using the user selected best matching function, includes applying the user selected best matching function to the quality of match values, in order to determine a best matching set of the prelearned positions of marks and the corresponding best quality matched prelearned pattern of forces, and wherein the device is a machine including a robot, such that a controlling movement of the robot is initiated in response to the identified pattern of forces acting on the elastically deformable skin.

18. A system for controlling a robot, comprising:
an elastically deformable skin including an outer impact surface having attributes and an undersurface having pins, ridges, or both, each undersurface pin or ridge includes at least one mark, and the undersurface is arranged on flexible spacers, the flexible spacers are attached to a rigid surface of a device;
a camera arranged to capture images of the marks;
a memory having stored data including image data of sets of prelearned positions of marks with corresponding prelearned patterns of forces, each set of prelearned positions of marks corresponds to a prelearned pattern of forces;
an image processor operatively connected to the camera and the memory, is configured to:
detect displacement of the marks in captured images;
compare the displaced positions of the marks in the captured images to the sets of the prelearned positions of marks, based on a distance function, to determine a quality of match value for each set of the prelearned positions of marks;
determine a best quality matched prelearned pattern of forces using a user selected best matching function, that is applied to the determined quality of match values, to calculate a best matching set of the prelearned positions of marks and the corresponding best quality matched prelearned pattern of forces;
identify a pattern of forces acting on the elastically deformable skin based on the determined best matched prelearned pattern of forces; and output the identified pattern of forces to initiate an action based on the identified pattern.

19. The method of claim 17, wherein the determining the best quality matched prelearned pattern of forces using the user selected best matching function, includes applying the user selected best matching function to the quality of match values, in order to determine a best matching set of the prelearned positions of marks and the corresponding best quality matched prelearned pattern of forces, and wherein the device is a machine including a robot, such that a controlling movement of the robot is initiated in response to the identified pattern of forces acting on the elastically deformable skin.

20. An elastomeric tactile sensor for a mobile device, comprising:
an elastically deformable skin including an outer impact surface having attributes and an undersurface having pins, ridges, or both, each undersurface pin or ridge includes a mark, and the undersurface is arranged on flexible spacers attached a rigid surface of the mobile device;
a camera positioned to capture images of the marks;
a memory having stored data including image data of sets of prelearned positions of marks with corresponding prelearned patterns of forces, each set of prelearned positions of marks corresponds to a prelearned pattern of forces;
an image processor operatively connected to the camera and the memory, is configured to:
detect displacement of the marks in captured images;
compare the displaced positions of the marks in the captured images to the sets of the prelearned positions of marks, based on a distance function, to determine a quality of match value for each set of the prelearned positions of marks;
determine a best quality matched prelearned pattern of forces using a user selected best matching function, that is applied to the determined quality of match values, to calculate a best matching set of the prelearned positions of marks and the corresponding best quality matched prelearned pattern of forces;
identify a pattern of forces acting on the elastically deformable skin based on the determined best matched prelearned pattern of forces; and
output the identified pattern of forces to a controller to initiate an action associated with the mobile device based on the identified pattern of forces.

* * * * *